(12) United States Patent
Navarro et al.

(10) Patent No.: US 7,383,215 B1
(45) Date of Patent: Jun. 3, 2008

(54) DATA CENTER FOR ACCOUNT MANAGEMENT

(75) Inventors: Paul Navarro, Baltimore, MD (US); Lawrence Dukes, Monkton, MD (US)

(73) Assignee: Fair Isaac Corporation, Minneapolis, MN (US)

( * ) Notice: Subject to any disclaimer, the term of this patent is extended or adjusted under 35 U.S.C. 154(b) by 445 days.

(21) Appl. No.: 09/697,062

(22) Filed: Oct. 26, 2000

(51) Int. Cl.
*G06Q 40/00* (2006.01)

(52) U.S. Cl. .................. 705/36 R; 705/35; 705/30

(58) Field of Classification Search .......... 705/30, 705/35, 36, 36 R
See application file for complete search history.

(56) References Cited

U.S. PATENT DOCUMENTS

| | | | |
|---|---|---|---|
| 5,063,507 A | 11/1991 | Lindsey et al. | 364/408 |
| 5,532,928 A | 7/1996 | Stanczyk et al. | 364/406 |
| 5,664,112 A | 9/1997 | Sturgeon et al. | 705/28 |
| 5,726,884 A | 3/1998 | Sturgeon et al. | 395/209 |
| 5,765,140 A | 6/1998 | Knudson et al. | 705/9 |
| 5,793,636 A | 8/1998 | Cooney et al. | 364/479.01 |
| 5,808,916 A | 9/1998 | Orr et al. | 364/578 |
| 5,850,446 A | 12/1998 | Berger et al. | 380/24 |
| 5,890,129 A | 3/1999 | Spurgeon | 705/4 |
| 5,963,925 A | 10/1999 | Kolling et al. | 705/40 |
| 5,987,132 A | 11/1999 | Rowney | 380/24 |
| 6,061,665 A | 5/2000 | Bahreman | 705/40 |
| 6,064,987 A * | 5/2000 | Walker et al. | 705/38 |
| 6,067,549 A | 5/2000 | Smalley | 707/104 |
| 6,098,052 A * | 8/2000 | Kosiba et al. | 705/40 |
| 6,119,103 A * | 9/2000 | Basch et al. | 705/35 |
| 6,185,567 B1 * | 2/2001 | Ratnaraj et al. | 707/10 |

FOREIGN PATENT DOCUMENTS

JP 2001282994 * 10/2001

OTHER PUBLICATIONS

"Fair, Isaac Customer Management Solutions Now Available on HP Computing Platforms", PR Newswire, Jun. 29, 1999.*
Hewlett-Packard: Fair, Isaac & HP announce customer relationship management strategic alliance M2 Presswire, Jun. 9, 1998.*

* cited by examiner

*Primary Examiner*—Michael Cuff
(74) *Attorney, Agent, or Firm*—Mintz, Levin, Cohn, Ferris, Glovsky & Popeo, P.C.

(57) ABSTRACT

The invention provides an account manager and database system that allows end users to bypass the need to integrate such systems in to their legacy information management systems. The account management and database systems are developed and maintained at a host service-bureau data center. The client accesses the account management and database systems through a communication link, usually a secure website. Decisions recommended by the account management system are then sent back to the client systems to take action. The client controls the account management system by utilizing the PCTable Maintenance System installed in the PC at the client site. Client also accesses the database at the data center for reporting and analysis.

The invention reduces the implementation schedule for such account management and database systems and thus provides such systems to end users more quickly.

17 Claims, 10 Drawing Sheets

TRIAD processing work flow for all decision areas.

Simplified rendering of a strategy with a single strategy key and two scenarios.

Overlimit Breakpoints in the Overlimit Collections – Strategy Parameters dialog box.

Action/Day fields in Delinquent Collections – Scenarios dialog box.

Example of a Credit Line strategy tree.

Example of Strategy Definition tables in PCMTS Audit report.

FIG. 9

Estimator Control dialog box.

FIG. 10

PCTMS navigation Features.

FIG. 12

Strategy Assignment dialog box.

Starting or Modifying a strategy.

DATA CENTER FOR ACCOUNT MANAGEMENT

BACKGROUND OF THE INVENTION

1. Technical Field

The invention relates to account management systems. More particularly, the invention relates to a method and apparatus that uses a data center for networked account management.

2. Description of the Prior Art

The leading account management system is the TRIAD system, manufactured by Fair, Isaac and Company, Inc. of San Rafael, Calif. TRIAD is a portfolio management and scoring system designed to help reduce losses, increase revenues, and take advantage of promotional opportunities, for single or multiple portfolios such as credit cards, telecommunications, and installment loans. With systems such as TRIAD, an end user's decision-making process can respond quickly to changes in the end user's customer population and the economic environment. The end user can test new strategies on a small part of a portfolio and still keep a current strategy in place on the majority of the portfolio. Systems such as TRIAD also provide reporting to measure the effectiveness of competing strategies.

Such account management systems currently available require significant internal resources of an end user before they can be integrated into the end user's legacy information management systems. It would be advantageous to provide an account management system that allows end users to bypass the need to integrate such system into their legacy information management systems.

SUMMARY OF THE INVENTION

The invention provides an account management system that allows end users to bypass the need to integrate such system into their legacy information management systems. The invention reduces the implementation schedule for such account management systems and thus provides such systems to end users more quickly.

BRIEF DESCRIPTION OF THE DRAWINGS

FIG. 9 is an example of a strategy definition table in a PCMTS audit report according to the invention;

FIG. 10 is an example of an estimator control dialog box according to the invention;

FIG. 12 is an example of a strategy assignment dialog box according to the invention.

DETAILED DESCRIPTION OF THE INVENTION

The invention provides an account management system that allows end users to bypass the need to integrate such system into their legacy information management systems. The invention reduces the implementation schedule for such account management systems and thus provides such systems to end users more quickly.

The presently preferred embodiment of the invention incorporates the TRIAD system manufactured by Fair, Isaac and Company, Inc. of San Rafael, Calif. as the account management engine. The TRIAD account management engine is discussed herein to the extent necessary to explain such system to those skilled in the art in connection with the invention disclosed herein. Further details of the TRIAD system can be found in *TRIAD 6.0 User Guide, TRIAD Concepts and PC Table Maintenance System Procedures*, Printing 1.0 (US) (Feb. 22, 2000), Fair, Isaac and Company, Inc., San Rafael, Calif., USA and *TRIAD 6.0 System Guide*, Printing 2.2 (US). (Apr. 13, 2000), Fair, Isaac and Company, Inc., which are included as an Appendix hereto.

The preferred embodiment of the invention is a comprehensive, Web-delivered account management solution for the telecommunications industry. It will be appreciated by those skilled in the art that the invention is readily applicable to other industries.

The preferred embodiment of the invention focuses on four key areas of account management to assist telecommunications companies in taking the right action on the right customer at the right time.

These key areas comprise:

Delinquent Collections;

Usage Limit Management;

Authorizations Management; and

Marketing Communications.

At the core of the presently preferred embodiment of the invention is an account management engine. The preferred account management engine is the TRIAD account management system manufactured by Fair, Isaac and Company, Inc. of San Rafael, Calif. The embodiment of the invention discussed herein provides a net sourced version of the TRIAD product having adaptations to the telecommunications industry. Those skilled in the art will appreciate that other account management systems may be substituted for TRIAD and that the invention is applicable to industries other than the telecommunications industry.

The preferred embodiment of the invention comprises a data warehouse that facilitates the use of scoring and decision modules, and that provide easy access to critical business data. The invention also comprises expert modules that enable end users to take advantage of the system quickly.

Figure 1:
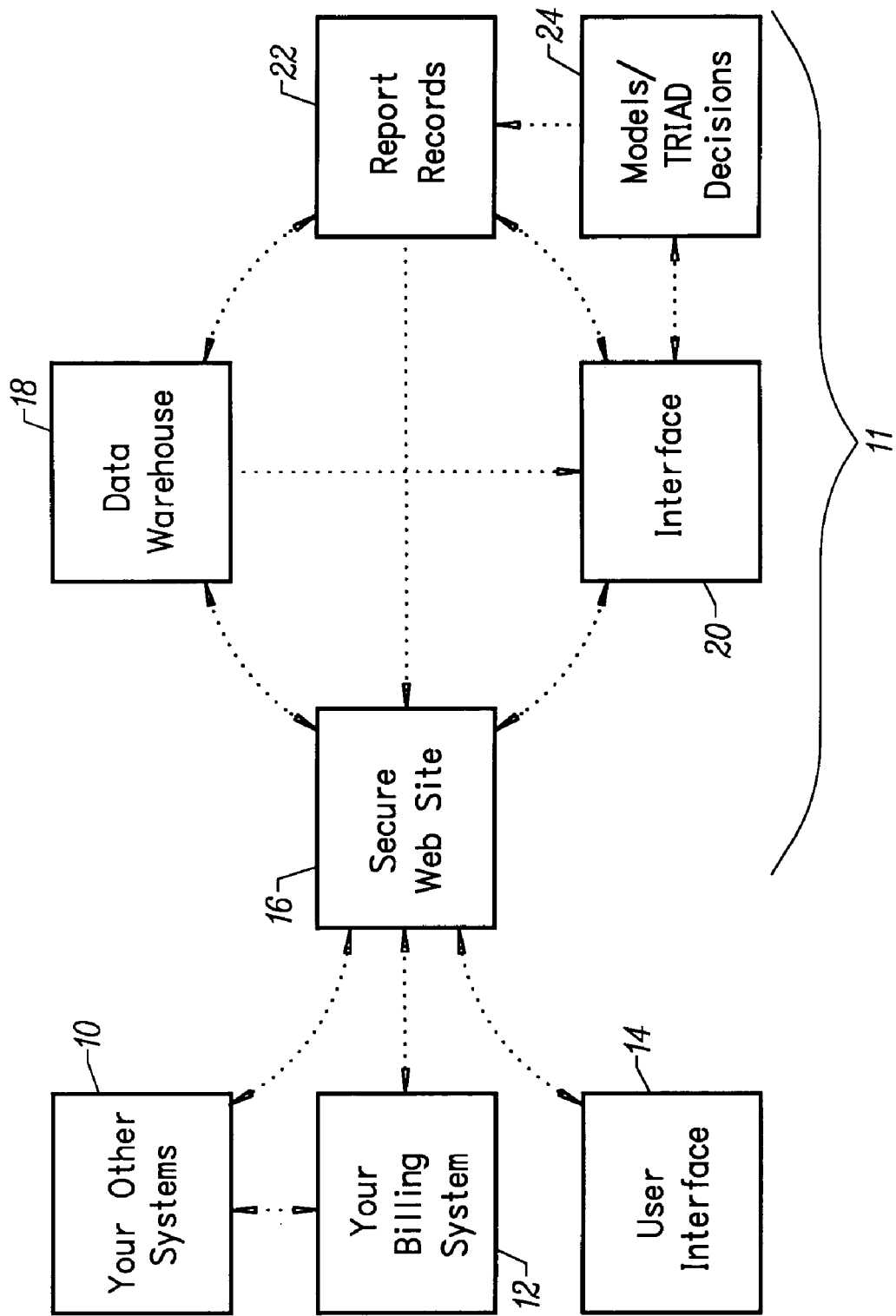
FIG. 1 is a block schematic diagram showing a data center for an account management system according to the invention.

FIG. 1 is a block schematic diagram showing a data center for an account management system according to the invention. The preferred embodiment of the invention is net sourced. Accordingly, decision functionality/predictive models 24, report records 22, and data warehouse 18 functions are deployed at a central data center 11 and integrated with an interface module 20. Data, strategies, decisions, and reports are exchanged with the end user's systems via a secure Internet Web site 16. The system is implemented in various components. The end user client 14 is a personal computer platform for the PCTMS graphical front-end (discussed below). The end user location also include the end user's billing systems 12 and other end user systems 10. However, the system itself, as well as all hardware and software associated therewith, is maintained at the central location. Thus, the system is readily adopted by the end user without the purchase, installation, or maintenance of additional hardware and software.

The invention's modular structure allows telecommunications carriers to apply statistically based automated decision making to the account management areas that are most relevant to them. Because the invention leverages the Internet, while all processing is performed at the central location, the invention minimizes the burden on the end user's technical resources and avoids increased processing loads on their systems. In the telecommunications industry, for example, carriers gain access to powerful account management decisioning without the long implementation typically required for installing software at their site.

The invention also comprises "champion/challenger" technology that allows new strategies to be tested by the end user on statistically valid sample populations before being rolled out to the end user's larger account base. For example. telecommunications carriers can easily refine strategies by using the menu driven graphical user interface. Because the invention is flexible and readily implemented, end users can respond quickly to changing conditions in a volatile marketplace.

Client Uses

Figure 2:
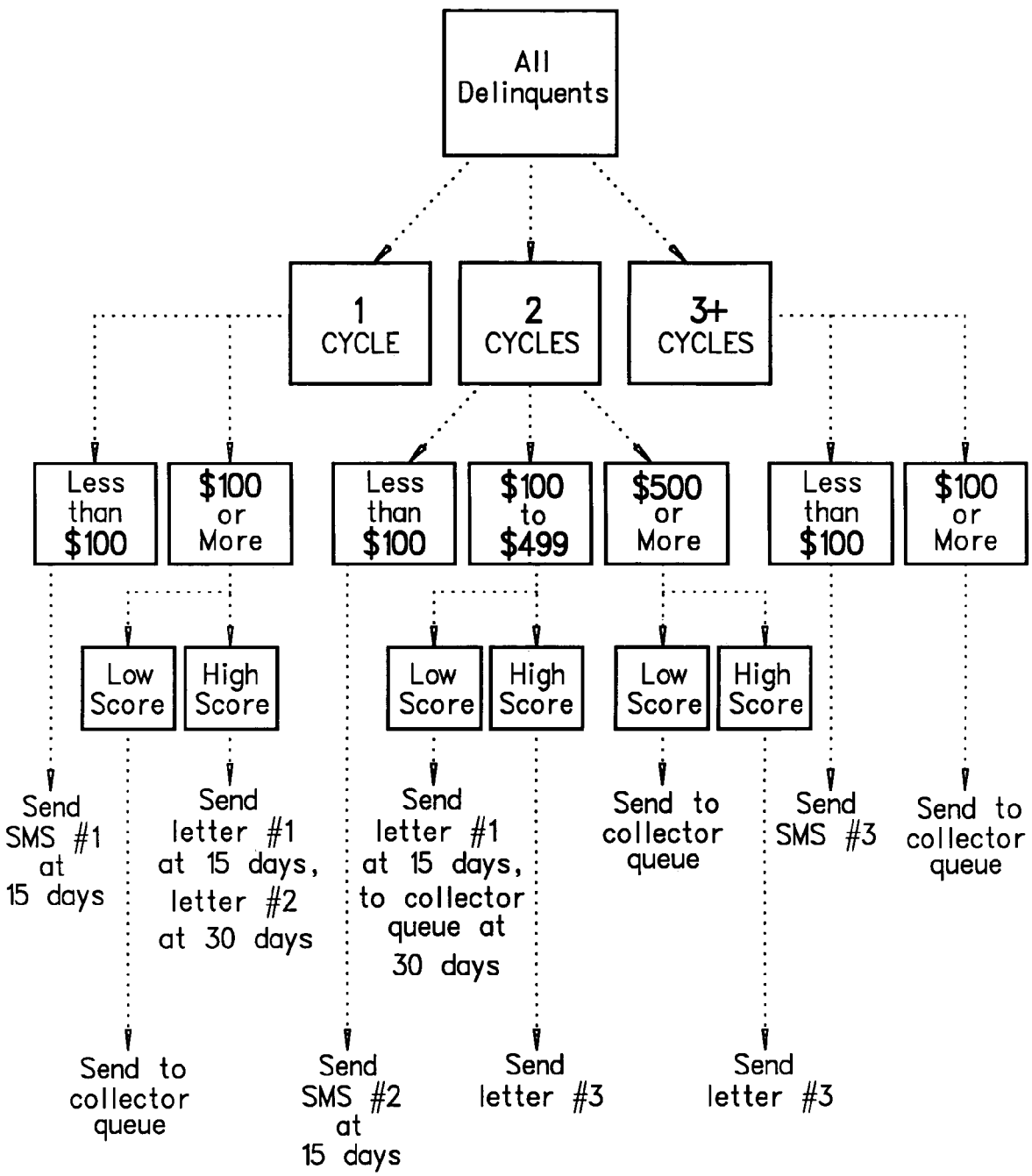
FIG. 2 is a block schematic diagram showing a delinquent collections strategy according to the invention.

Delinquent Collections: The invention provides a mechanism that reduces delinquencies and that uses collections resources more efficiently by assessing accounts in order of their risk and then queuing them for action accordingly. FIG. 2 is a block schematic diagram showing a delinquent collections strategy according to the invention.

Usage Limit Management: The invention provides a mechanism that improves end user profits by expanding usage while controlling risk. The invention allows an end user to determine whether to assign or adjust usage limits based upon each customer's credit risk.

Authorizations Management The invention provides a mechanism that reduces the end user's risk of losses by reviewing account status to determine whether high risk accounts should be hotlined or blocked.

Marketing Communications: The invention provides a mechanism that effectively targets cross-sell and retention efforts to maximize end user revenue and minimize risk and churn.

Account Management Engine/Client

The preferred account management engine comprises a portfolio management and scoring system. Such systems are typically designed to help reduce losses, increase revenues, and take advantage of promotional opportunities, for single or multiple portfolios such as credit cards, telecommunications, and installment loans.

The preferred embodiment of the invention comprises client and host system components. The client, e.g. the PCTMS front end component of the TRIAD system, is loaded on a PC in a networked installation. The PCTMS application is used to manage the database files and control settings that are uploaded to the host system for processing. Actual processing occurs on the host system. The in-stream architecture integrates the account management engine with end user master file account management programs and allows the system to process end user accounts efficiently with less impact to the end user's system.

Strategies are developed utilizing the PCTMS. The PCTMS includes applications which provide a graphical view of strategies and strategic portfolio assignments. The PCTMS also lets the end user view scorecard assignments. Another PCTMS feature allows an end user to view score-card data and (optionally) update existing score-cards or add new scorecards.

The preferred embodiment of the invention uses data areas allocated by a calling program to receive input and return results. The preferred account management engine does not perform input and output functions on the end user's master file or data tables. Instead, it writes only to its own files, primarily a report record file. This file contains all account management engine actions and other information on each account through-out the cycle. This file then feeds the client systems required to take the actions recommended through TelAdaptive. These client systems can include a collections system, predictive dialer and notice generation application. The report record file is input to all monthly reporting, as well as ad-hoc reporting. The report record file also drives an estimator facility, and may be sampled to reduce the processing overhead.

The preferred embodiment of the invention provides a way to group similar accounts and treat them strategically in different decision areas. The following discussion explains the basic system concepts of strategic portfolios, scoring, strategies, and decision areas.

Strategic Portfolios

After choosing general exclusions for processing, the end user's determine the strategic portfolios, or groups of accounts that can be managed collectively because they share common characteristics. Each portfolio has an identification number called the strategic portfolio identification number or SPID. As used herein, the term SPID refers both to the strategic portfolio and its identification number.

Accounts are assigned to SPIDs in a SPID assignment dialog box in the PCTMS. For example, Gold and Classic bankcard accounts are usually grouped into separate SPIDs. In the retail environment, different chain stores or geographic regions might require unique SPIDs. For installment lending, direct and indirect loans are typically assigned to different SPIDs. Similarly, commercial and residential accounts often require different SPIDs in the utility sector.

Scoring

Behavior scoring is a tool for assessing the future behavior of an account. It works by making a series of calculations that quantify current and past behavior at the account level or customer level. Associated with most behavior scores are the odds that the account performs well in the future. Typically, the higher the odds, the better the account is likely to perform.

The behavior score is an invaluable component of a strategy. With behavior scoring, an end user can use risk as a primary factor in assigning actions. For example, accounts with greater risk can be accelerated to collections, while accounts with less risk can be decelerated.

Using risk assessment, an end user can develop more accurate and finely-tuned strategies.

Strategies

As used herein, a strategy is a plan for assigning an account to a specific scenario, or action for treatment. the account management engine provides an end user with the ability to compare competing strategies in a statistically valid way so that the end user can determine which strategy produces the best results. This type of comparison is called champion/challenger testing herein. The existing strategy is the champion; the new strategy is the challenger.

Champions and Challengers

As a new strategy proves its effectiveness, it can be applied to a greater percentage of the end user's portfolio. When a challenger becomes a new champion, the strategy design cycle begins again.

The end user continually moves strategies through four distinct phases of development:

Evaluate strategy results from the previous month.
Develop new strategies or enhance existing strategies based on the evaluation results.
Test new strategies using an estimator facility.
Implement new strategies in the production environment.

Using this design and evaluation process ensures that the most effective strategies are at work in the end user's live environment.

A key to establishing champion and challenger testing is understanding the roles of random digit groups and strategy assignment.

Random Digit Groups

In the presently preferred embodiment of the invention, each account has a two-digit number between 00 and 99, called a random digit or a test digit. This number is assigned by the host system when the account is opened or brought into the account management engine. Random digits stay with an account long-term. They are changed when the entire file is re-randomized after a prolonged period of champion versus challenger testing, or when there are a significant number of accounts that are acquired or merged on the host billing and posting or authorizations system.

A consecutive series of random digits forms a random digit group. For example, 0 through 4 is a random digit group representing a five percent sample of a portfolio. Random digit groups are assigned to decision area strategies for each strategic portfolio or SPID.

Strategy Assignment

In the PCTMS, the strategy assignment dialog box links strategies to one or more random digit groups for each strategic portfolio or SPID. Each strategy has a strategy identification number from 1 to 999. Strategy ID 999 is reserved for excluding an account from system treatment in a specific decision area.

Decision Areas

An end user can use decision areas to apply separate strategies for each key process that influences the profitability of the portfolio. Table 1 below lists the decision areas available in the preferred account management system.

TABLE 1

Decision Areas

| Decision Area | Description | Timing |
| --- | --- | --- |
| Authorizations management | Controls approve, decline and refer decisions. | Primarily at authorization, but optionally, batch; administrative tasks at cycle |
| Usage Limit Management | Controls credit line and cash line decisions. | Cycle |
| Delinquent Collections | Manages collections for past due accounts, including those that are past due and over limit. | Cycle and daily posting |
| Marketing | Manages cross-sell and other communications to the cardholder. | Cycle or standalone |
| Communications | Manages collections for current, over-limit accounts. | Cycle and daily posting |
| | Adjusts product terms such as annual percentage rate (APR) based on account performance. | Cycle or standalone |
| | Determines reissue periods for expiring cards. | Cycle or standalone |

Design Process

Figure 3:
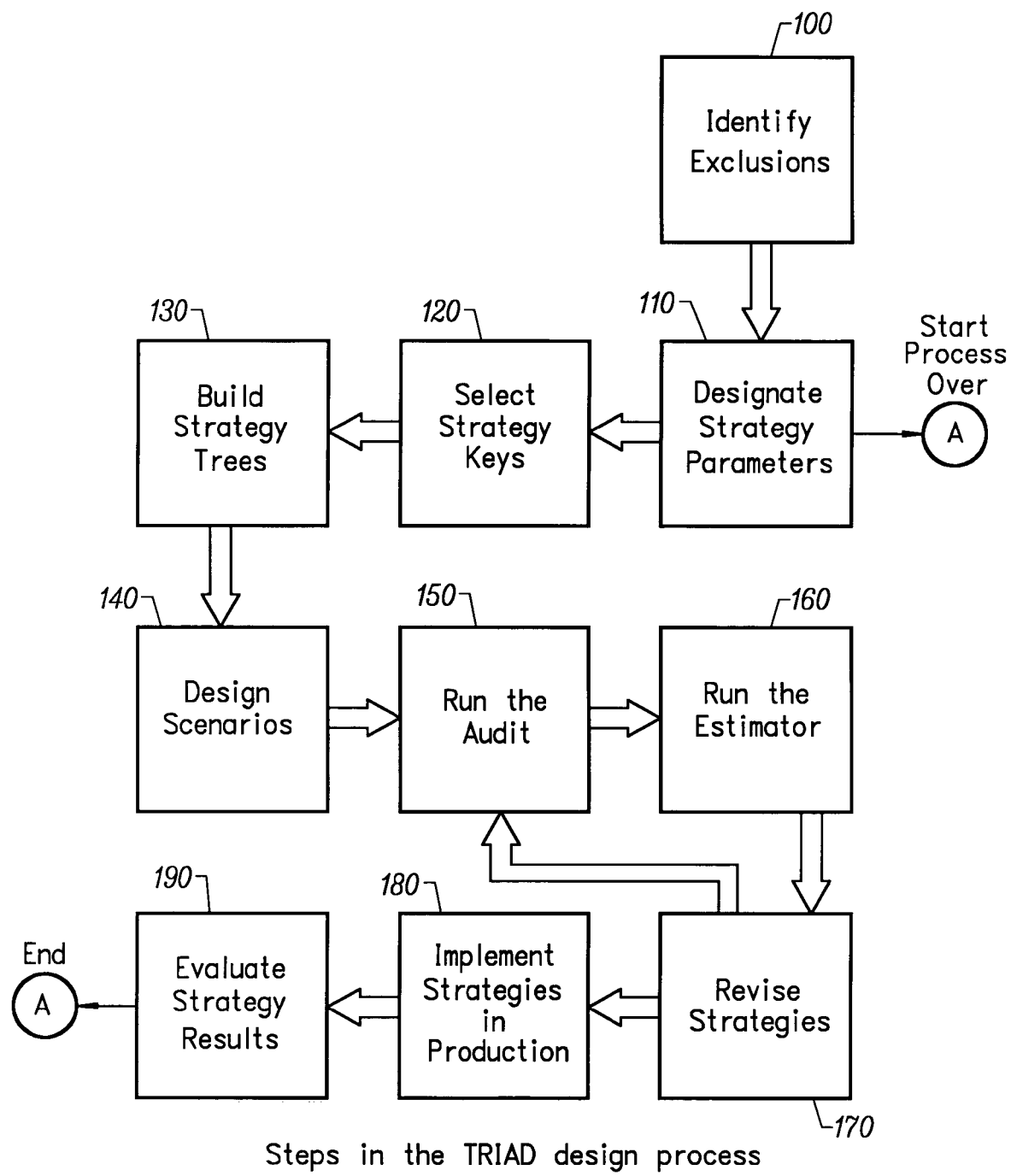
FIG. 3 is a block schematic diagram of an account management system design process according to the invention.

The design process is similar in all decision areas. The steps involved are shown in FIG. 3 and described below.

Identify Exclusions (100)

The end user may exclude categories of accounts from behavior scoring and each decision area. For example, an inactive account might be excluded from delinquent collections, but not excluded from marketing communications or authorizations. Other exclusions are general and are applied before decision area processing. Exclusion categories are defined by the end user and the design team and, for areas other than behavior scoring, are selected from an exclusions dialog box in the PCTMS.

Designate Strategy Parameters (110)

Entry into each decision area is triggered by a primary event, such as being over limit or delinquent. Further processing in the decision areas is also triggered by events. In the overlimit collections decision area, for example, this occurs when crossing an overlimit breakpoint. If the first overlimit breakpoint is 105% utilization, an over-limit strategy is invoked when that threshold is crossed.

Select Strategy Keys (120)

Strategy keys sort accounts into groups that receive different treatments. For example, fields such as cycles delinquent, month-on-books, and behavior score, are often used as keys in the credit line and delinquent collections decision areas. Strategies in each decision area use strategy keys from the keys dialog box in the PCTMS from which standard and user-defined decision keys can be selected. When an end user builds a strategy, he can select a unique set of keys from the library or copy an existing set from another strategy in use.

Build Strategy Trees (130)

By using strategy trees, an end user can separate accounts into tightly defined treatment groups and take actions that balance revenue and risk.

For example:

Account 1 has been open for six months, has a low behavior score and is two cycles delinquent. This account is a candidate for a credit line decrease, not an increase.

Account 2 has been open for thirteen months, has a high behavior score and is current. This account is a potential candidate for a credit line increase.

Design Scenarios (140)

Scenarios are actions assigned to each treatment group in a strategy. Actions can range from simple to complex. A simple action can be to take no action at all. A complex action can include setting a block code, sending a letter, setting a collection indicator, or printing a statement message.

Run the Audit (150)

The audit programs must be run when developing a new strategy or modifying control fields. Audits are run on both the PC and host system. The PC audit program performs all field-level and cross-field audits, and some cross-table audits. Once the PC audit is successfully performed, control files are uploaded from the PC to the host system, usually in a test environment. The host system audit program is run to complete the remaining cross-table validation and verify that the upload was successful. If an audit program encounters errors, it produces an error report allowing the end user to identify where corrections are required.

Run the Estimators (160)

The estimator program tallies the number of accounts identified by each control table row and the odds or risk quality for these accounts. The estimator runs on the host system using the development control tables and selected records from the production report record file. The system produces separate reports for each decision area in the end user's installation.

Revise Strategies (170)

After the audit and estimator programs have been run, it is typically necessary to revise strategies to achieve optimum strategy results. Prior to implementation into production, audit and estimator programs are run again to ensure that revisions do not produce any errors.

Implement Strategies in Production (180)

When the end user is satisfied with the strategy results and the audit and estimator programs have successfully run, the end user's in-house procedures are used to move strategies into production. Immediately after the move, the audit program is run to verify that files were not corrupted during the move and to generate the control files used in the production environment.

Evaluate Strategy Results (190)

The system has a full reporting facility that runs weekly or monthly. The reports show strategy and decision area results with extensive behavior score reporting. When a challenger strategy results prove more effective than the current champion, or as other strategy adjustments need to be made, the design process begins again.

System Processing

Figure 4:
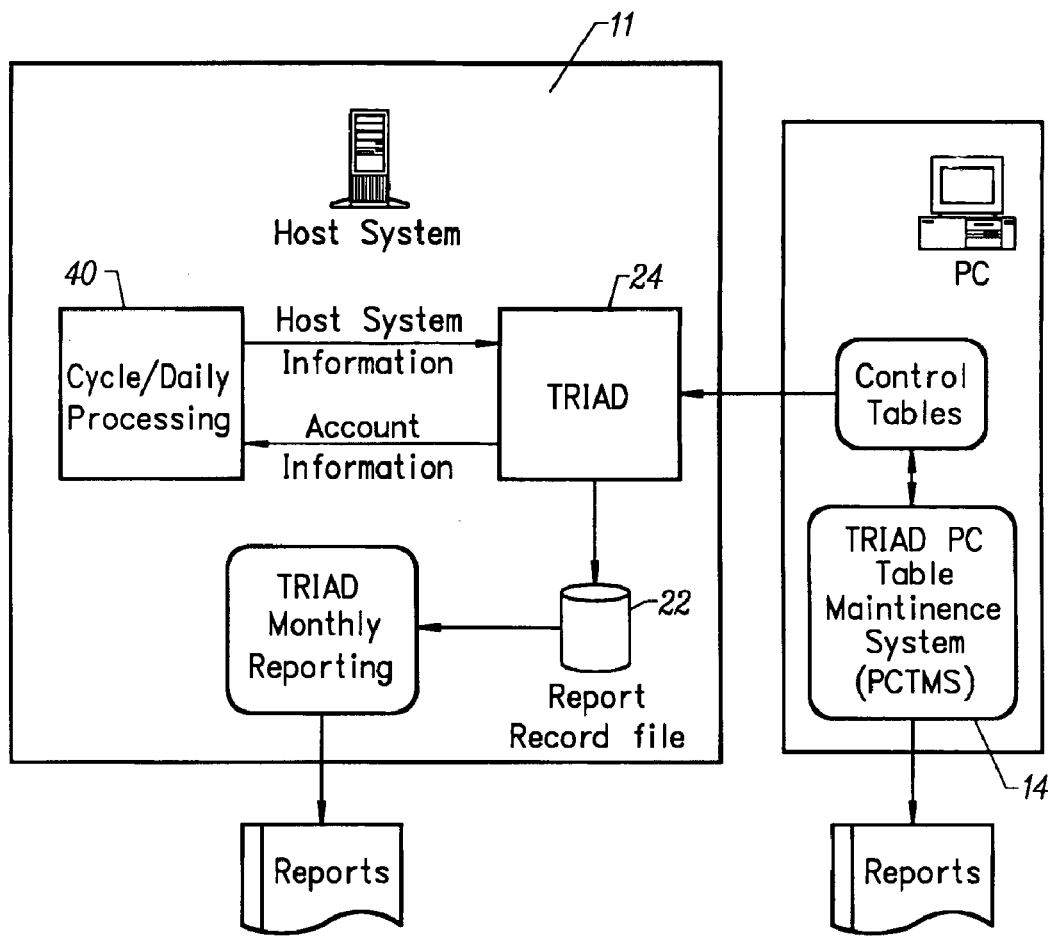
FIG. 4 is a block schematic diagram of a processing work flow for a all decision areas in an account management system according to the invention.
Figure 5:
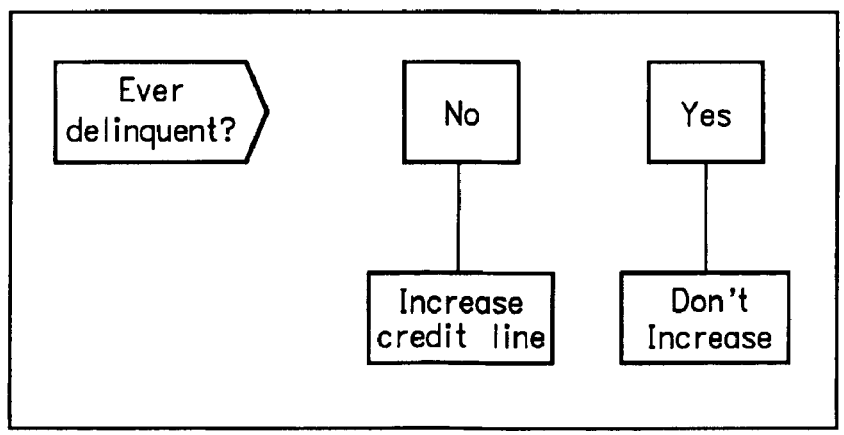
FIG. 5 is a block schematic diagram showing a strategy with a single strategy key and two scenarios according to the invention.

FIG. 4 is a block schematic diagram showing system processing work flow for all decision areas according to the invention. System processing can occur at various times, such as cycle, daily posting, weekly or monthly for reporting, on-demand, or at transaction due date time. The cycle, daily posting, and transaction processing parts of the system fit into the end user's existing systems. The reporting and on-demand jobs can be run on a standalone basis.

Cycle Processing

Cycle processing 40 is the periodic review of the account when a statement may be written and financials and delinquency are aged. Typically, this is once a month, although some portfolios have different timing. At cycle, the system is called to compute a new behavior score, sort accounts into treatment groups, and return a set of actions. All actions determined at cycle are written to the report record file. The records generated at cycle are input to the weekly or monthly outcomes and performance reports. After the file is pared down by a sample factor of the end user's choice, the resulting file is input to the estimator process. It is possible to use the entire, unsampled file in an environment.

The order of processing at cycle is, for example:

1. Assign the account to a strategic portfolio (SPID).
2. Assign strategy IDs for the decision areas, including authorizations, if applicable.
3. Calculate the behavior score.
4. Review the account for credit line actions.
5. Review the account for delinquent collections actions.
6. Review the account for overlimit actions.
7. Write to the report record file.
8. Return actions and other data to the calling program.

The order of processing can vary from this. The addition of the reissue management, marketing communications, or performance-based pricing decision area, for example, may add other reviews to the account during cycle processing. These areas can be run as stand alone jobs, or as a part of cycle processing. After the new behavior score has been calculated, it is used in subsequent processing. Similarly, if a new credit line is calculated, it is used in subsequent processing.

After all decision area processing has been completed, the system returns actions and other data, such as behavior score and new credit line, to the calling program. The calling program must implement the actions and store all the data.

Daily Posting

Accounts that are delinquent or over limit are treated by the system during daily posting. The system first determines if the account fits into an excluded category. If it does, it is not processed. A classic example in delinquent collections is an account that was delinquent at cycle, but has now been reclassified as bankrupt. If bankruptcy is an exclusion, the account is not processed. However, a non-excluded delinquent or over-limit account may receive one or more of the following actions:

Set a block code.

Queue the account to collections.

Send a letter.

Take no action.

The system records all actions in the report record file for use in outcomes reports.

Report Processing

Reports are produced by regularly scheduled processing. They are also included in standalone processing for those decision areas that allow this option. The system uses the report record file to create a variety of reports, including outcomes reports, strategy performance reports, scorecard performance reports, estimator reports, and formatted report records. Estimator reports and formatted report records are generated on-demand. Outcomes and performance reports are regularly scheduled reports that are run monthly or weekly. A weekly run is often used as an intermediate step to consolidate report records and minimize month-end processing time.

Because the outcomes and performance reports contain sum-of-cycle data, and not point-in-time month-end data, the numbers may not match with traditional month-end reports provided by other systems external to the system.

Outcomes Reports

Outcomes reports tally counts and amounts. If an end user wants to know how many letters were sent as a result of actions from delinquent or overlimit collections scenarios, the outcomes reports for those decision areas contain that information. Similarly, they show behavior score distributions and exposure changes resulting from credit line changes.

Performance Reports

The system has several types of performance reports, for example:

Strategy performance reports compare overall performance across decision areas.

Scorecard performance reports monitor the performance of the scorecards over time.

Delinquent status transition matrix reports monitor the movement of accounts from one stage of delinquency to the next.

On-Demand Processing

On-demand processing refers primarily to running the audit program, the estimator program and reports, and printing formatted report records. It also means updating the control tables in the PCTMS or running the reissue management, marketing communications, and performance-based pricing decision areas whenever desired.

Audit Program

The host system audit program performs most of the cross-table validations of the control tables and produces an audit report for a successful audit. The report is a series of table images that are preferably identical to the PCTMS audit report for identical client data. If the audit program encounters an error, it generates an audit error report. The host system audit and audit error reports can be printed for viewing the control tables or errors.

Estimator Reports

Estimator reports show the number of accounts in each row of the development control tables and the behavior score good/bad odds associated with the row. The system runs the estimators using a user-defined sample number of records from the production report record file. Estimator reports provide a valuable tool in determining the impact that a strategy has in terms of operations and profitability. These reports can be generated at any time and should preferably be run before implementing new or modified strategies. Estimator report features are specific to each decision area. The end user can modify estimator parameters in the PCTMS. These parameters are uploaded to the host system along with the end user's control tables. The estimators run on the host system.

Formatted Report Records

In addition to outcomes and performance reports, the following types of records are customarily used for testing purposes and can be generated for most decision areas.

Score Test records

These records show the calculated values of all characteristics used to generate the score for each account. The score test record format can be enabled in the generate test score records field located on the general tab in the scoring options dialog box in the PCTMS.

Pass/Return Test records

These records give the values of the pass and return fields used in the linkage between the system and the client. The pass/return test record format can be enabled in the Test PR10 field located in the test data output options tab in the options dialog box (Client Parms icon group) in the PCTMS.

Strategy Key Test records

These records give the calculated values of all keys or a subset of keys actually used in the decision area strategies for that account. This test record format has options for generating test key values and test key records by account or by decision area. The strategy key test record format options can be enabled in the test key value, test key by account, and test key by decision area fields located in the test data output options tab in the options dialog box (Client Parms icon group) in the PCTMS.

Control Tables

The system uses a series of control tables as input to processing. The tables define all the system parameters, including decision area strategies and scenarios, reporting parameters, system control fields, and scorecard assignment keys.

Transaction Processing

The authorizations management decision area is transaction-based. It runs as a part of the end user's on line authorization system or, optionally, in a batch environment. Reporting and estimator functions run on demand in batch mode.

About Behavior Scoring

This following discussion presents a brief overview of the procedures to develop, implement, and track the performance of behavior scorecards. A behavior score quantifies ever-changing credit risk at the individual account or customer level by summarizing the risk into a single number. It does so by analyzing a series of risk predictors, such as payment, delinquency, and usage patterns. The behavior score enables the end user to make decisions about an account relative to the risk it presents. This is done in the PCTMS by incorporating the behavior score as one of the criteria, or strategy keys, in the end user's strategies. This enables the end user to increase revenue by promoting usage and loyalty among low-risk accounts. The end user can also limit potential losses on high-risk accounts by blocking further usage and recovering as much of the outstanding balance as possible. The term behavior scorecard encompasses several types of scorecards offered by Fair, Isaac, as shown in Table 2 below. These scorecards are shown for purposes of example and other scorecards may be used in connection with the invention. Some of these scores are based on internal billing and payment information, whereas others are based on external credit bureau data.

TABLE 2

Scorecards

| Scorecard Type | Description |
| --- | --- |
| Standard Behavior (Risk) | Corresponds to the probability of an account remaining good, for example, not reaching an advanced state of delinquency or becoming bankrupt or charged off. |
| Payment Projection | Corresponds to the probability of repayment or the possible percentage to be repaid from accounts in advanced stages of delinquency. |
| Recovery | Corresponds to the amount or percentage of the balance to be recovered from accounts that have been charged off. |
| Churn | Corresponds to the probability of an account becoming inactive or closing. |
| Revenue | Corresponds to the amount of revenue an account is likely to produce. |
| Cross-sell Response | Corresponds to the probability of success in a cross-sell campaign. |

For purposes of the discussion herein, standard behavior (risk) scorecards are used as examples. However, the terminology, procedures, and reports described here pertain to most types of scorecards.

Terminology

An important part of understanding the scoring process is understanding scoring terminology. See Table 3 below.

TABLE 3

Basic Scorecard Terminology

| Term | Definition |
| --- | --- |
| Aligned Score | A raw score with alignment factors applied to keep the score to its original odds-to-score relationship. It is also called the behavior score. |

TABLE 3-continued

Basic Scorecard Terminology

| Term | Definition |
|---|---|
| Attribute | Range of values for a characteristic. Each attribute range has an associated weight that contributes to the raw score. |
| Bad Account | An account that is classified as unsatisfactory based during the performance period based on the scorecard performance measures. For a standard behavior risk model, a bad account is one that becomes charged-off, bankrupt, canceled, has merchandise repossessed, or reaches an advanced stage of delinquency (such as three or more cycles) during the performance period. |
| Characteristic | A measurement of account behavior. Essentially, it poses a question about an account. For example, the months-on-books characteristic asks, "How long has this account been open?" A characteristic can be a primitive data element, that is, a data field passed into TRIAD for the purpose of generating a behavior score or another calculation. Highest Delinquency Lifetime is an example of this kind of characteristic. A characteristic can also be a combination of data fields, such as Percent of Payments Greater than Amount Due Over the Last Five Months. |
| Divergence | A relative measure of the strength of a scorecard. In simple terms, it is the separation between goods and bads. |
| Good Account | An account that is classified as satisfactory throughout the performance period based on the scorecard performance measures. For a standard behavior risk model, a good account is one that has either remained current throughout the performance window, or not been more than n times one-cycle delinquent during that time period (for example, three times one-cycle delinquent). |
| Indeterminate Account | An account that did not qualify as good or bad during the performance period. |
| Observation Date | Date from which predictors are generated. |
| Odds | The number of goods per bad. |
| Odds-to-Score | The relationship of the odds to the score, such as odds of 60 to 1 at a score of 600. The odds-to-score relationship is determined during the scorecard delivery meeting. May also be referred to as scaling. |
| Performance Date | Date n months after the observation date at which the performance of each account in the development sample is defined. |
| Performance Definition | Defines of what is being predicted and classifies accounts as either good, bad, or indeterminate. Behavior scorecards use different performance definitions depending on what each will predict. For example, a standard behavior scorecard measures risk. Payment projection scorecards predict the amount or percentage of repayment from an account already in an advanced state of delinquency (bankcard or retail) or purchase repossession (installment loan). |
| Performance Exclusion | A special category for accounts requiring separate performance tracking. Some accounts are in an unusual status where it is difficult or impossible to accurately assign good, bad, or indeterminate performance measures. For example, a credit card that is reported as lost or stolen during the performance period may be classified as a bad account, however the activity is not controlled by the original cardholder. The performance of every scored account is processed and classified, so the accounts are not omitted or excluded from TRIAD. Any account identified as a performance exclusion during the performance period is not tallied in the Scorecard Performance reports. |
| Performance Period or Window | Length of time between the observation date and the performance date. For standard bankcard and retail behavior scorecards, this period is often six months. Once behavior scorecards have been implemented, this term refers to the amount of time over which the performance of the scorecards is examined. |
| Points to Double the Odds (PDO) | Number of points in a scorecard that it takes to double the odds. Example: If a score of 580 has associated odds of 30 to 1 and a score of 600 has odds of 60 to 1, twenty points in a score doubles the odds. The PDO is determined during the scorecard delivery meeting. |
| Raw Score | Sum of the weights for all characteristics in a scorecard. |
| Scorecard | A table referencing predictive variables, called characteristics, and associated attribute ranges and weights. |
| Weight | Value assigned to an attribute range. |

Scorecard Development

This following discussion presents an overview of the scorecard development, a complex process requiring intensive analysis of your data.

The general procedure for scorecard development is as follows:

1. Identify account categories for exclusion and retention.
2. Define the performance window.
3. Define scorecard performance measures.
4. Define the odds-to-score relationship.
5. Define sub-population splits.
6. Develop characteristics and attributes.
7. Produce preliminary scorecards.
8. Implement scorecard.

Identifying Exclusion and Retention Categories

Some accounts are excluded from scoring. Exclusions may include, for example, accounts that are in some unusual status causing delinquency and payment patterns to appear abnormal (deceased, disputed) or accounts that are subject to special treatment. Similarly, if an account has had no activity for several cycles, a new score may not provide as good a measure of performance as a score calculated before the account reached that length of inactivity. When the existing score is used instead of a newly-calculated score, the score is said to be retained.

Exclusions from Behavior Scoring

The preferred embodiment of the invention does not calculate a behavior score for accounts that meet the criteria for scoring exclusion categories. Instead, it moves a special, user-assigned code to the aligned behavior score and raw behavior score fields and zeroes to the scorecard ID field. The user-assigned code is a number between 1 and 30. The end user can use this code as he would a behavior score, to segregate categories of exclusions for special treatment in a strategy. Excluded accounts are tallied in the behavior score exclusion report.

Accounts that are excluded from scoring this cycle are not automatically excluded from future scoring or from decision area processing. For example, an inactive account may not be scored, but it may still be allowed in the following decision areas:

Authorizations.

Marketing communications, to attempt to reactivate it.

Overlimit collections, if it reactivates and exceeds its credit or cash limit.

The list of exclusions is hierarchical. If an account qualifies for exclusion in more than one exclusion category, it is excluded for the first reason encountered. For example, if an account is both bankrupt and charged-off and the hierarchy positions bankrupt before charged-off, bankruptcy becomes the exclusion code. It is then tallied in monthly reports as a bankruptcy exclusion.

Retaining a Score

Retaining a score means using the prior cycle's score during the current cycle instead of calculating a new score using current information or excluding the account from scoring. A score may be retained for a number of reasons. Short term inactivity is the foremost retention reason.

When a score is retained and the previous month's score is available, the prior cycle's aligned and raw scores are aged into the current cycle's scoring fields, and the scorecard ID field value is assigned a reason retention code plus the retain scorecard factor. This factor is typically +2000, however, it can be set to a different value in the PCTMS. For example, consider an account with an aligned score of 657 that has been inactive for six months. This period of inactivity triggers score retention. As shown in Table 4, when the score fields are aged, the aligned score and raw score fields retain their previous scored value of 657, and the scorecard ID field value is changed to a retention reason code of 31 (which might be used to designate short-term inactive accounts, for example) with a prefix of +2000.

TABLE 4

Aged Score Field Values When Previous Month's Score is Available

| Scoring field | Previous month | Current month |
| --- | --- | --- |
| Aligned Score | 657 | 657 |
| Raw Score | 657 | 657 |
| Scorecard ID | 2 | 2031 |

If an account does not have a valid score to age, a user-defined retention reason code, such as 31, is moved to the raw score and aligned score fields, and the scorecard ID field value is assigned the retention reason code plus the prefix of +2000, as shown in Table 5.

TABLE 5

Aged Score Field Values When Previous Month's Score is Not Available

| Scoring field | Previous month | Current month |
| --- | --- | --- |
| Aligned Score | Not available | 31 |
| Raw Score | Not available | 31 |
| Scorecard ID | Not available | 2031 |

Retention reason codes are assigned in the exclusion and retain reasons dialog box in the PCTMS.

Scoring Accounts Excluded from Scorecard Development

Accounts that are open one or two months at the time of scoring do not have the full financial history needed to calculate a score. Newly booked accounts are excluded from the datasets used to develop behavior scorecards. However, the scorecards may be used later to score newly booked accounts at implementation. Accounts that are excluded from scorecard development but scored later in implementation are tracked separately. The calculated score is moved to the raw behavior score field. The \scorecard ID field value becomes the number of the score-card ID used to calculate the score plus a non-development scorecard factor. This factor is typically +1000, however, it can be set to a different value in the PCTMS. For example, if the newly booked account is scored using scorecard 2, then the scorecard ID field value 1002.

The behavior score distribution report by SPID and scorecard ID has separate columns for scorecard ID 1001, 1002, and so on. The scorecard performance reports have separate pages for Scorecard ID 1001, 1002, and so on. Scorecard ID values may vary by installation. The PCTMS displays the values for the end user's installation in the non-development scorecard factor and retain scorecard factor fields on the score factors tab in the scoring options dialog box.

Defining the Performance Window

In scorecard development, the performance window is the period between the observation date and the performance date. Often this is a six-month period. In implementation, this length of time is the full period reported on the scorecard performance reports. During this period of time, the performance of the account is determined.

Defining Scorecard Performance Measures

Each type of scorecard has its own performance measure, depending on what is being predicted. In a behavior risk scorecard, the performance of an account is defined as good or bad in terms of risk. Once the definition is established, accounts are classified as goods (low risk) or bads (high risk). If an account does not fit into either definition, it is an indeterminate.

Odds-to-Score Relationship

At the scorecard delivery meeting, you establish the odds-to-score relationship. Score-cards may, for example, be scaled so that a score of 600 has odds of 60 to 1. The odds indicate the probability that an account will or will not reach an unsatisfactory condition over the next specified number of months. Odds of 60 to 1 at 600 mean that out of 61 accounts with a score of 600, 60 will remain satisfactory and 1 will not. The odds cannot tell the end user which account out of the 61 will be the one that becomes bad. Table 6 shows a sample odds-to-score relationship.

TABLE 6

Sample Odds-to-Score Relationship Table

| Score | Odds |
| --- | --- |
| 600 | 60 to 1 |
| 580 | 30 to 1 |
| 560 | 15 to 1 |
| 540 | 7.5 to 1 |
| 520 | 3.75 to 1 |
| 500 | 1.88 to 1 |

Notice that the odds double for every twenty point increase in score. A score of 540 has associated odds of 7.5 to 1. A score of 560 has odds of 15 to 1, double the odds at the previous score. The number of points to double the odds (PDO), is decided at the delivery meeting. After the scorecards are implemented, the end user can track the odds-to-score relationship on the scorecard performance reports.

Defining Sub-Population Splits

Risk for different populations can best be assessed by custom, tailored scorecards. Predictive and robust scorecards can be built using small and homogeneous sub-populations. The more homogeneous the sub-population, the more predictive the scorecard is for that group of accounts. The behavior and risk trends within a sub-population can be characterized by unique sets of predictive characteristics. Using a score-card developed for one sub-population on a very different sub-population does not yield satisfactory results. For example, a scorecard that depends heavily on analysis of past delinquency would not perform well for a clean population; that is, a population of accounts that had not been delinquent in the specified time period. To identify likely sub-populations within the overall portfolio, the scorecard developer performs a segmentation analysis.

| Common splits are: | |
| --- | --- |
| Months-on-books | New or old |
| | New accounts have been open up to a specified number of months and old accounts have been open longer. |
| Historical delinquency | Clean/dirty |
| | Clean accounts have no history of delinquency over n months and dirty accounts have been delinquent at least once during the n-month period. |
| Current delinquency | Current/1-cycle delinquent/2-cycles delinquent |
| | This split is based on current level of delinquency. |

Groups are often combined. For example, an old clean current scorecard would operate on the population that was on the books a specified number of months, was never delinquent during a defined previous period, and was current this month. The general rule for a sub-population is that a group must be large enough to have an acceptable number of goods and bads.

Developing Characteristics and Attributes

The system calculates raw behavior scores from account characteristics and attributes.

Characteristics ask questions about an account, such as What is the highest level of delinquency this account has reached in the last six months? or What is the ratio of the actual payment to the minimum required payment over the last six months?

Attributes provide a series of multiple choice answers to the questions posed by the characteristics. Each attribute has a weight (number of points) associated with the answer. It is the summation of the weights that produces the raw behavior score. The series of characteristic questions comprises the scorecard.

Generating characteristics requires extracting fields from each account record. Typically, a month-end or billing-time observation file is used to generate characteristics. If scoring occurs at billing and data from month-end is used in development, only fields that have remained unchanged between billing and month-end may be used.

Some characteristics, such as highest lifetime delinquency, need only a single field from the account record. Others, such as ratios over time, need two or more fields. After characteristics are created, each is evaluated for its ability to separate good and bad accounts in the development database. Any field used for a characteristic in the development phase must be available after scorecards are implemented. Not only must it be available, but its status must be identical. For example, a cycle-to-date field might contain the full accumulation for the cycle or it may have been initialized back to zero for the new cycle. If the development characteristic used the full cycle amount, the implemented version of the characteristic must be calculated before that amount is reset to zero.

Producing Preliminary Scorecards

Just as a scorecard is composed of characteristics, so a characteristic can be broken down further into attributes. A number of processes take place before the final set of attributes is determined. The last of the processes is called coarse classing, where very fine level individual attributes are grouped to obtain statistical reliability at the coarse attribute level. Attributes that represent similar risk levels are grouped together. Similar attribute groupings in different characteristics often have very different predictive values. The same characteristic may appear in more than one scorecard, although the attribute weights typically differ.

In Table 7, the characteristic average balance last six months has four attributes. The characteristic months since delinquency has five attributes, including never. With the characteristic months since delinquency, the score increases as the time since last delinquency grows. An account that has never been delinquent gets the highest, or best, score. Some characteristics give a larger range of scores, an indicator that they carry more weight than others. The characteristic total payments as a percent of total balance over the last 6 months seems to be a weaker indicator than months since delinquency. However, the characteristics are a better indicator when used together than when used alone.

TABLE 7

Sample Score Compiled for a single Account

| Characteristic | Attribute | Weight | Example Score |
| --- | --- | --- | --- |
| Total Payments as % of Total Balance Last 6 Months | 0-3% | 60 | 74 |
| | 4-8% | 74 | |
| | 9-12% | 81 | |
| | 13-35% | 90 | |
| | 36-100% | 81 | |
| Months Since Delinquency | 0-3 | 21 | 79 |
| | 4-5 | 54 | |
| | 6-9 | 67 | |
| | 10+ | 79 | |
| | Never | 90 | |
| Purchases this Period as % of Previous Balance | 1-19 | 60 | 77 |
| | 20-49 | 67 | |
| | 50-89 | 71 | |
| | 90-99 | 77 | |
| | 100+ | 71 | |
| Average Balance Last Six Months | <250 | 62 | 85 |
| | 250-499 | 75 | |
| | 500-3499 | 85 | |
| | 3500+ | 49 | |
| Percent of Balance that is Cash Advance | 0 | 85 | 50 |
| | 1-19 | 68 | |
| | 20-49 | 50 | |
| | 50+ | 43 | |
| Current Balance as % of Highest Balance | 1-39 | 58 | 75 |
| | 40-69 | 65 | |
| | 70-79 | 69 | |
| | 80-89 | 75 | |
| | 90-100 | 71 | |
| Total Example Raw Score | | 440 | |

The raw score is the sum of the weights of each characteristic in the scorecard. Table 7 above shows a sample score compiled for an account. An example score for each characteristic is shown down the right column. In this example, information about the account translates into a raw score of 440. Once scorecards are finalized, they are implemented and tested to ensure that they are performing as designed.

Scorecard Implementation

The definition of each scorecard and its components are available for review in the scorecard manager facility of the PCTMS. At cycle time, the system selects the appropriate scorecard for each account based on the decision logic on the host system, as implemented from the scorecard assignment tree on the PCTMS. The scorecard assignment keys for this tree are selected during the scorecard design process and require hard coding. The end user can track a scorecard's performance using the reports described herein. When it is necessary to adjust or realign the scores to restore the original odds-to-score relationship, the end user edits the alignment factors—the multiplier and the weight—in the scorecard assignment tree.

Behavior Score Tally Reports

Behavior score retention and exclusion data is recorded in the report record file for each account. At the end of the month, all the information is tallied and summarized for reporting. Collectively, the outcomes reports are known as the cycle tally reports.

The system produces the following behavior score cycle tally reports:

Behavior Score Exclusions by SPID.
Behavior Score Distribution by SPID and Scorecard ID.
Behavior Score Distribution by SPID, Delinquency, and Credit Utilization.
Behavior Score Distribution by SPID, Delinquency, and Cash Utilization.
Behavior Score by Credit Bureau Score by SPID.

Cycle tally reports are produced once a month, typically at month-end. They can also be produced daily or weekly, if needed. Under normal conditions, monthly reports are sufficient. During the first month of a new strategy, daily or weekly tallies may be useful.

Reports are produced by SPID. Each report is produced for each SPID and for the total of all SPIDs. The title of each report contains the first and last date for which data was included. If it is necessary to see the characteristics and attributes for each account, the system can generate an extra record on the report record file. This record is called the behavior score test record. It is a valuable test tool that the end user can enable by setting the generate test score records field on the general options tab in the scoring options dialog box in the PCTMS. This option allows the end user to produce test score records for all scorecards or for individual scorecards via scorecard manager.

Behavior Score Exclusions by SPID

This report displays the number of accounts in the exclusion and retention categories. The end user can use this report to determine the number of accounts with each specific exclusion score. This can be useful information for any scoring exclusions that would pass through the end user's strategies. All the data is collected at billing.

Behavior Score Distribution by SPID and Scorecard ID

This report displays the behavior score distribution across scorecards. For each score-card, the report shows the number and the percentage of accounts in each behavior score range. The end user defines the behavior score ranges (exactly forty) in the PCTMS report ranges dialog box. This report is used to verify the score ranges being scored on each scorecard. The behavior score distribution by SPID and scorecard ID report prints with as many pages as needed to display information for all scorecards used in the installation.

Behavior Score Distribution by SPID, Delinquency, and Credit or Cash Utilization This reports assists in monitoring the use of credit and cash lines. Both versions of the report show utilization for current, one-cycle, two-cycle, and total being less than three-cycle delinquent accounts only. One example of this report is the behavior score distribution by SPID, delinquency, and credit utilization report. The behavior score distribution by SPID, delinquency, and cash utilization report has an identical reporting matrix as the credit utilization report, and can be suppressed if the end user's company has neither cash balances nor cash lines.

Behavior Score by Credit Bureau Score by SPID

This report shows account status by behavior score compared to credit bureau risk score for each SPID. The matrix cells report for the combination of behavior score and credit bureau risk score nn months ago, as displayed below the SPID name in the report heading. The information includes counts of the number of goods and bads in each cell, as well as the odds and population percentage.

Scorecard Performance Reports

The scorecard performance reports provide information about the predictive ability and the performance of the scorecards for an indicated period. Although there are differences among the reports, their purposes are similar; the reports allow the end user to assess if the scorecards are performing according to their design specifications.

They do this by:

Providing the end user with a view of performance. If the scorecard is performing well, a high score range shows a greater number of accounts that remain cur-rent and a lower number of accounts that reached an advanced stage of delinquency. The lower ranges show the opposite.

Furnishing the number of goods and bads associated with each score range. From these numbers, the end user can calculate the odds and assess the performance of the scorecard relative to its design specifications. For example, if the odds-to-score ratio was designed to be 60-to-1 at a score of 600, with 20 points doubling the odds, a quick calculation of the odds at scores of 600 and 620 provides a very rough scorecard performance check.

If an account fits in two categories on the report, it is reported in the more severe of the categories. For example, if the categories are four or more cycles delinquent and bankrupt, the account is reported bankrupt. Each report spans a performance period associated with a scorecard ending in the current month. The interval is defined in the report headings. The reporting interval is identical to the performance interval except for the period immediately after the system is implemented. For example, if the performance period is six months, it takes six months to accumulate performance data. During that period, the reports assess performance over the available period. Reports produced during the first month would be meaningless because there would be no interval against which to measure performance.

Reports are produced monthly. For each account, performance information is collected on the day the account cycles. The information is then processed for the interval period when the month-end reports are run. Only accounts scored at the beginning of the performance period are included in the scorecard performance reports. For example, if the performance period is six months, accounts scored six months ago are included.

The performance by score reports use an identical reporting matrix.

Performance by score reports include:
Behavior Score by SPID and Scorecard ID.
Behavior (Payment Projection) Score by SPID and Scorecard ID
Raw Score by SPID and Scorecard ID.
Credit Bureau Score by SPID.

Each of the reports listed above and shown on the following pages shows a slightly different version of scorecard performance. The two behavior score by SPID and scorecard ID reports show the maximum level of delinquency reached by accounts in each aligned behavior score range during the performance period. The raw score by SPID and scorecard ID report gives the same information by raw behavior score range. Before the scorecards are realigned, the numbers on these two reports are identical. The credit bureau score by SPID uses the same delinquency matrix, but shows the data by credit bureau risk score range.

The system tallies accounts in the behavior score by SPID and scorecard ID and behavior (Payment Projection) score by SPD and scorecard ID reports as follows:

If the scorecard was designated as a discrete good/bad performance scheme field (located in the scorecard definition dialog box in scorecard manager) from the beginning of the performance window used for scorecard performance reporting (not the window used to score the account), then the account is tallied on the behavior score By SPID and scorecard ID report.

If the scorecard was designated as a continuous good/bad performance scheme, then the account is tallied on the behavior (payment projection) score by SPID and scorecard ID report.

The system uses the value in the good/bad performance scheme designation, not the scorecard type, to determine which report to produce.

Strategies

This following discussion describes strategy development, from creating the basic components through evaluation. Strategy development is an ongoing process in which today's aggressive challenger becomes tomorrow's champion.

The following discussion explains:
Strategy elements (triggers, strategy keys, and scenarios).
Strategy trees.
Champion/Challenger strategies.
Strategy assignment.
Strategy evaluation tools.
Strategy Performance reports.

Strategies are used to increase revenues, reduce losses, or create promotional opportunities for end user customers. The PCTMS lets the end user test new ideas against the ideas embodied in an existing business strategy. The strategy that depicts current business practices is called the champion; the new test strategy is called a challenger. If a challenger produces the desired results, the end user can easily roll it out as a new champion. It is also possible to have several challengers being tested against a champion within the same decision area.

Figure 7:
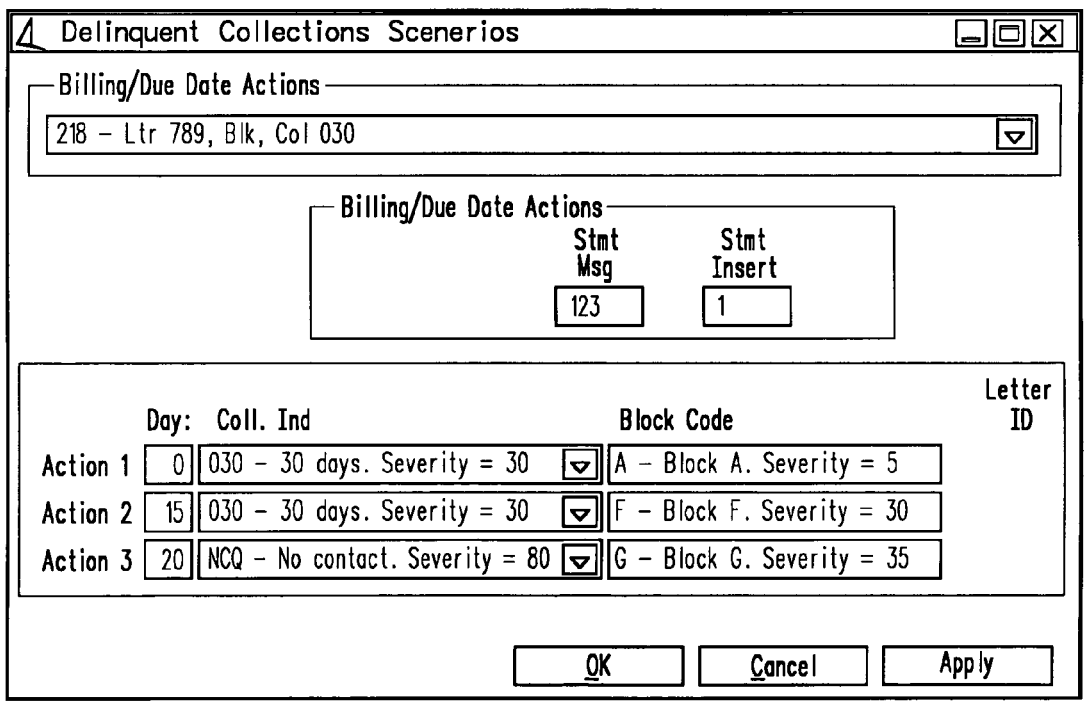
FIG. 7 is an example of action/day fields in a delinquent collections—scenarios dialog box according to the invention.
Figure 8:
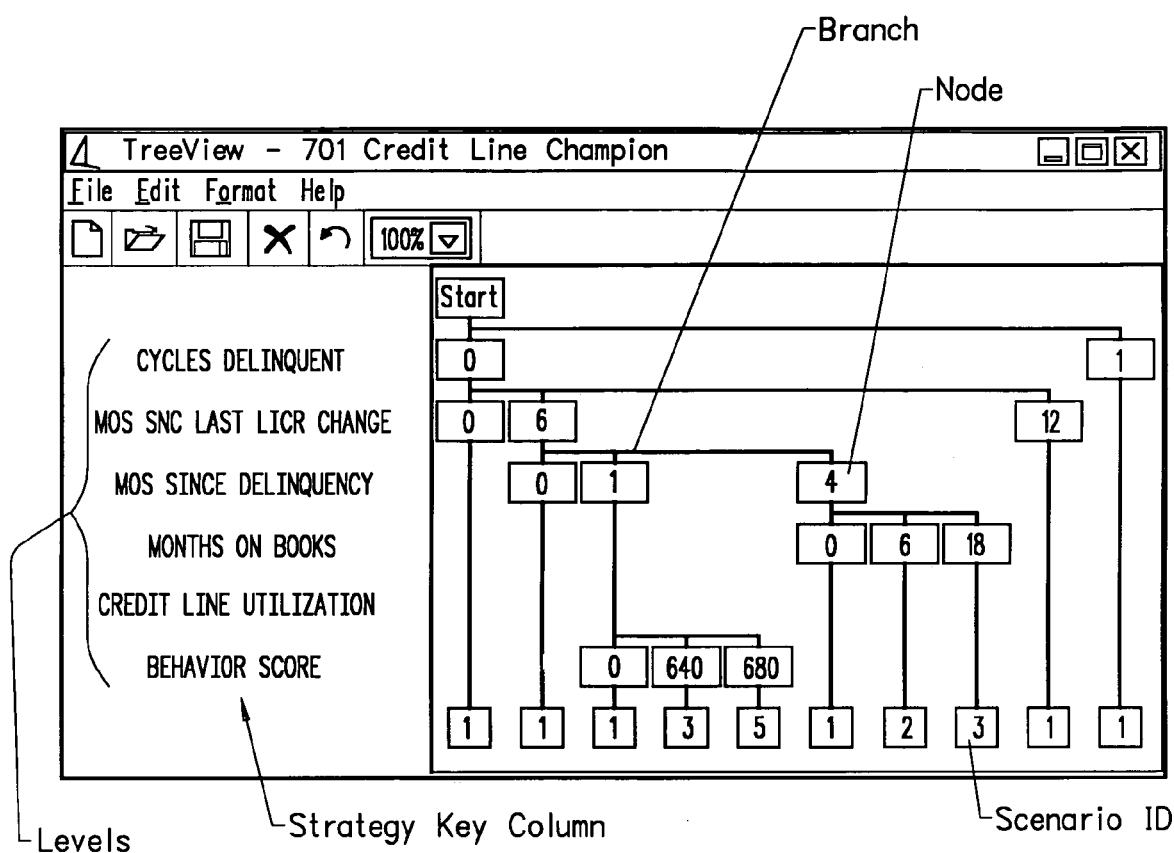
FIG. 8 is an example of a credit line strategy tree according to the invention.

FIG. 7 is a simplified rendering of a strategy. The single criterion or strategy key on the left shows that there is interest in only one thing for the accounts on which this strategy is run, namely whether they have ever been delinquent. This strategy increases the credit line for accounts with a value of no for delinquency and does not increase it for accounts with a value of yes. Those two scenarios are displayed at the bottom of the decision chart. Real strategies are much more sophisticated. The trial and error involved in the search for the proper combination of keys, values, and scenarios is what makes a proven champion strategy so valuable.

In the preferred PCTMS, an end user can define up to 998 different strategies for each decision area. Strategy ID 999 is reserved for assigning accounts to be bypassed from decision area processing. Strategy IDs are specific to each decision area and logically independent. Strategy 101 in credit line management, for example, is not the same as strategy 101 in authorizations management.

The first step in building a strategy is to determine the optimal set of decision keys. The second step is to build a strategy tree using the assigned keys. Once the end user creates strategies, they must be assigned to a random digit group and SPID. Finally, when the end user is satisfied with the integrity of a strategy tree logic, he uploads the database files to the host system for implementation.

Strategy Elements

Every strategy, regardless of decision area, has the same basic elements:

Trigger, or timing events, that initiate action in the decision area.

Strategy keys, also known as decision keys, that determine which criteria in an account profile is used in defining the strategy decision logic. Strategy key values define the strategy decision logic and determine which scenario is applied to an account.

Scenarios that define the actions to be taken for each account profile.

Strategy assignment that links a group of accounts to a strategy that may be the champion or a challenger.

Triggers

Triggers are circumstances that alert the system to the need for a review and, potentially, an action in a decision area. In some decision areas, such as credit line management, the decision is based on timing criteria. In other areas, such as delinquent collections, account status initiates the review process, but scenario timing parameters control when actions are taken. In the marketing communications and performance-based pricing decision areas, the triggers are a series of filtering tests that determine which accounts are reviewed for treatment.

Account Status Triggers

In some decision areas, account status is an initial trigger for review.

In the overlimit collections decision area, accounts must be both over limit and non-delinquent.

In the delinquent collections decision area, the account must be delinquent.

In the authorizations decision area, accounts are typically over limit or mildly delinquent.

In each case, an account status check or pre-screen precedes the initial review in the decision area. Account status triggers do not initiate an action; they merely pass accounts into a decision area for further review.

Timing Triggers

Overlimit breakpoints are a good example of timing triggers. Amount breakpoint and percent utilization, shown in FIG. 6 are two types of overlimit breakpoints.

Figure 6:
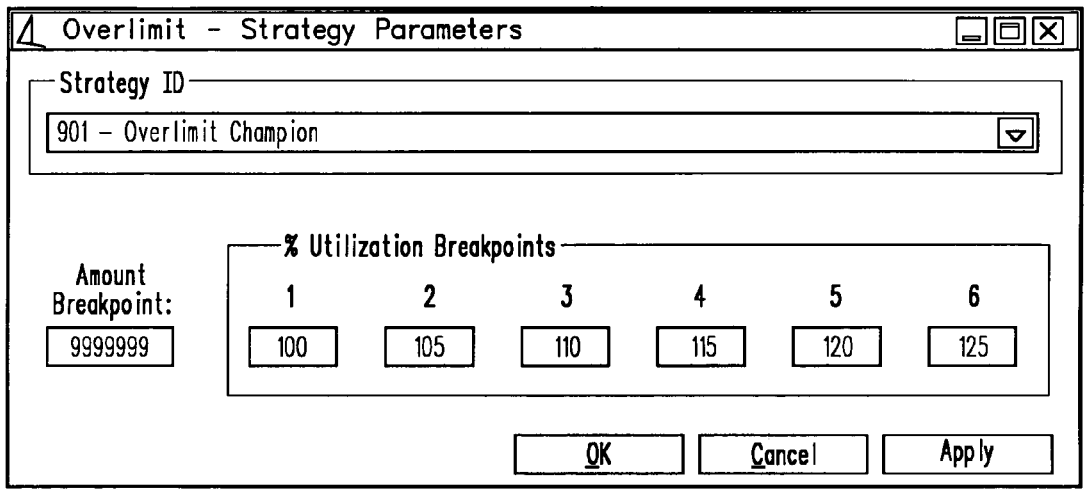
FIG. 6 is an example of overlimit breakpoints in the overlimit collections—strategy parameters dialog box according to the invention.

The third percent utilization breakpoint in FIG. 6 is set to 110. This means that the balance before posting balance (pre-post balance) must be less than 110% of the credit limit and the balance after posting must be equal to or greater than 110% of the credit limit.

When an account in the strategy fits this description, it has crossed a breakpoint. Only when one or more of the breakpoints is crossed does the system take an over-limit action.

Scenario Triggers

Not all treatments are based on timing alone. In some decision areas, special triggers are built into the scenarios. For example, in delinquent collections, the action/day fields trigger the corresponding treatments, as seen in FIG. 7.

Delinquent collections scenarios have three action sets. To create the scenario, the end user defines when each action set occurs relative to cycle. In FIG. 7, actions occur five days, fifteen days, and twenty days after cycle.

Filtering Triggers

Marketing communications and performance-based pricing use filtering triggers to choose which accounts should be reviewed. The triggers for each strategy are selected from the Keys library. The end user specifies the triggers, trigger sequences, the range of trigger values to test, and if the trigger is required, optional, or not used.

Strategy Keys

Strategy or decision keys are one of three essential building blocks (along with parameters/triggers and scenarios) from which the end user creates strategies. They are characteristics that define accounts and sort them into different treatment groups or scenarios. The end user can select up to 15 keys from the keys library in the preferred embodiment. When the end user creates a strategy, he can define a unique set of strategy keys or copy keys from an existing strategy, giving him optimum flexibility. Each strategy key is designated for use in appropriate decision areas. Some keys, such as cycles delinquent, may pertain to several decision areas, while others, such as reissue review point, may apply only to one, in this case, reissue management. When the end user builds a new set of keys for a strategy, only those keys designated for the decision area in which he is working are available for use. The designation of which strategy keys are available for each decision area can be modified in the Keys dialog box located in the client parameters group on the PCTMS navigation bar.

The PCTMS gives three ways to choose strategy keys for a new strategy. The end user can:

Select keys from the keys library.

Copy only the keys from an existing strategy.

Copy both keys and key properties from an existing strategy. Properties include the defined lower-bound values used in the strategy logic.

A current project determines the method chosen For example, if the end user wants to build an entirely new strategy, he might begin with a new set of keys selected from his keys library. If the end user's goal is to create a strategy that is a slight variation of an existing strategy, he would copy keys and properties from the existing strategy and then make adjustments. Designing a strategy requires the end user to assign value ranges for each strategy key used in the strategy.

Scenarios

Scenarios are another building block that make up strategies. A scenario is a set of actions that are taken on accounts meeting the criteria defined in a strategy.

Examples of scenario actions are:

Enclose a statement insert

Print a statement message

Set a block code

Set a collection indicator

Send a letter

Do nothing

Each strategy can use many different scenarios. Within each decision area, more than one strategy can use the same scenario. The profile of the account or transaction receiving the scenario actions is defined by a branch of a strategy tree in the PCTMS. A scenario ID identifies each unique action or group of actions. Scenarios for decision areas such as credit line and delinquent collections have pre-defined types of actions (action categories). For example, a delinquent collections scenario might contain a block code, collection indicator, and a letter ID. A credit line scenario could specify a credit line increase or decrease and a message to be printed on a statement.

Although the action categories have been defined, the end user has control over the values in them, such as the amount of the increase or decrease. The timing of scenario actions varies with the decision area, specific schedules, and the parameters and triggers defined.

The PCTMS allows the end user to customize some of the labels for scenario actions. These labels display on the desktop, and are reflected on the audit report and formatted report record print.

Scenario Examples

Some decision areas have fixed actions from which to choose. In other decision areas, the user defines all or part of the actions. The descriptions below summarize the actions for each decision area. In the preferred embodiment, the end user can define up to 999 scenarios in each client decision area, with the exception of authorizations. The end user can define up to 300 scenarios in the authorizations management decision area.

Delinquent collections decision area scenario actions can be phased to occur three times throughout the cycle. Standard delinquent collections actions are:

Print a statement message (cycle only)

Include a statement insert (cycle only)

Send a letter

Send the account to a collections queue

Set a block code

Some overlimit collections decision area scenario actions are triggered by crossing a breakpoint. Standard overlimit collections actions are:

Send a letter

Send the account to a collections queue

Set a block code

Other overlimit collections decision area scenario actions are triggered regardless of whether a breakpoint is crossed. Example of these actions are:

Print a statement message

Include a statement insert

Credit line management decision area scenario actions take place only at cycle. Standard credit line management scenarios are:

Increase or decrease a credit, cash, third, or fourth line

Print a statement message

Send a letter

Waive an over-limit fee

The reissue management decision area combines preset actions, such as whether or not to reissue a bankcard, and user-defined actions, such as notifications.

The authorizations decision area combines preset actions, such as whether to approve, decline, or refer the transaction, and user-defined actions, such as notifications.

For the marketing communication decision area, all actions are user-defined, such as sending letters or creating a queue for a telemarketing campaign.

For the performance-based pricing decision area, most actions are user-defined, such as specifying the APR or fee waiver period.

Strategy Trees

Figures 9, 10:
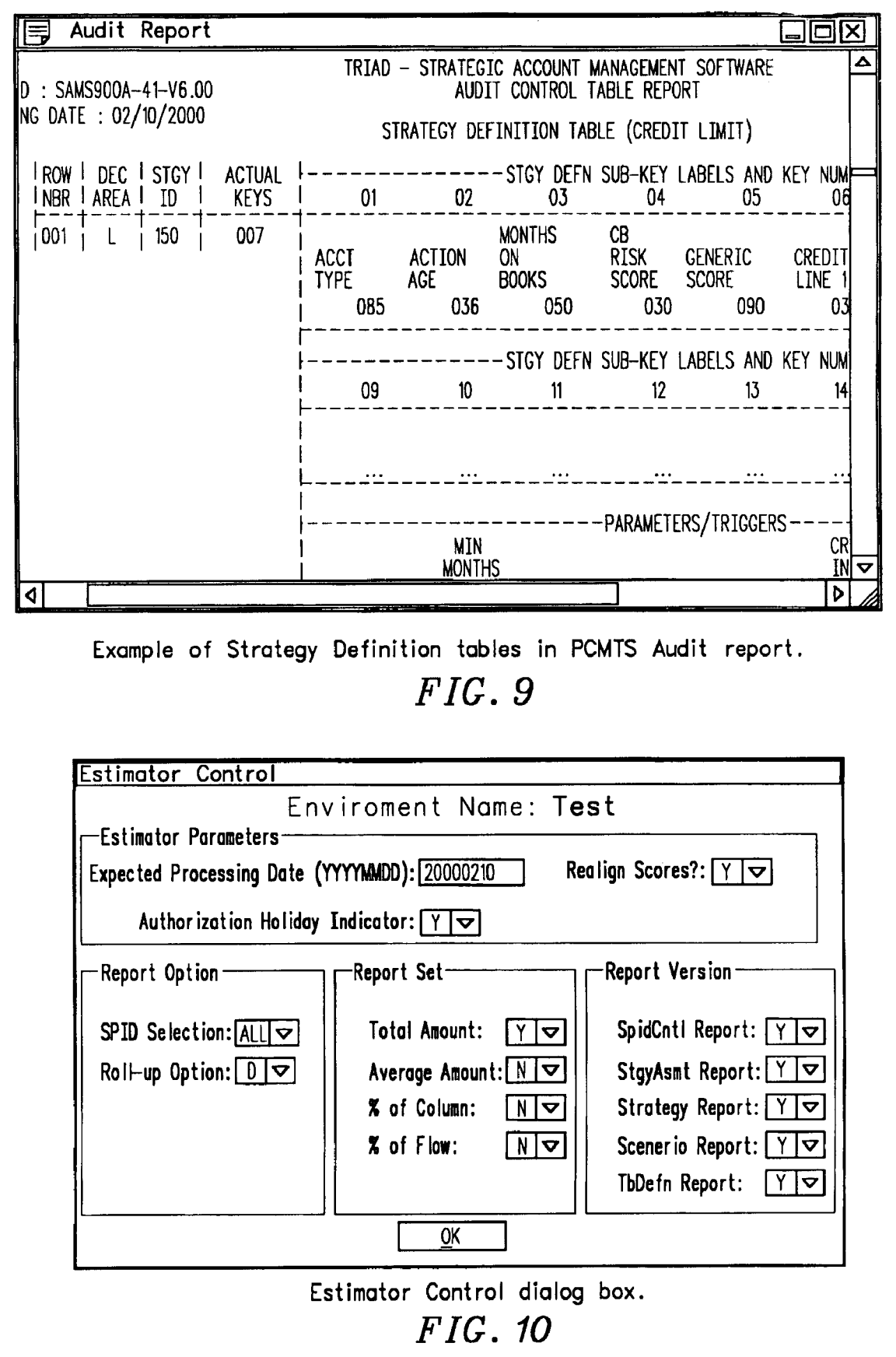

The PCTMS displays strategies in a tree format in a window in each decision area. Strategy trees consist of strategy keys, branch lines or paths that lead to each scenario, nodes that display lower-bound key values for determining the path each account follows, and the resulting scenarios. FIG. 10 shows a sample Delinquent collections strategy. Elements of a strategy tress are shown in Table 8 below.

TABLE 8

Elements of a Strategy Tree

| Tree Element | Description |
|---|---|
| Strategy Key Column | Keys that contain the criteria that define the values at each horizontal level of the tree. The function of the strategy keys is to assign each account to the desired scenario. Strategy trees can have up to 15 strategy keys, taken from the Keys dialog box in the PCTMS. |
| Branch | Pathway from a node of the tree to the resulting scenario. |
| Level | Horizontal row of the strategy tree corresponding to a strategy key. Nodes display the values along each strategy key level. |
| Node | A decision box along a strategy tree branch. Each node displays a user-defined lower-bound value within the corresponding strategy key range. The following example illustrates how accounts flow down the nodes, using the sample strategy tree in FIG. 16. Accounts 0 cycles delinquent will flow down first branch on the left side of the first key level. Accounts flowing down this branch with a Months Since Last Credit Line Change value of 6 to 11 will flow down the branch with the node value of 6 at the second key level, and those with a Months Since Delinquency value of 4 to 999 (the maximum key range value) will flow down the branch with the node value of 4 at the third key level. Finally, accounts flowing down this branch with a Months On Books value of 6 to 11 (fourth key level) will be assigned to scenario 2. |
| Scenario ID | Number that identifies the scenario, or set of actions to be taken on an account. Valid ID numbers are 1 through 999. The PCTMS displays the scenario ID in a box at the bottom of each branch. |

Champion/Challenger Strategies

The strategy that depicts current business practices is the champion. The new test strategy is the challenger. Champion and challenger strategies are identified by strategy ID and name in the strategy assignment dialog box in the PCTMS and in the corresponding TreeView—Strategies window for each decision area. Before a new or modified strategy is implemented in production, the end user determines the percentage of the strategic portfolio to which to assign the strategy using random digit groups. Depending on the end user's particular needs, the champion strategy may be assigned to a wider range of random digits than the challengers.

Each champion and challenger group should be assigned to a large enough range of random digits to have a representative number of accounts treated in the decision area. For example, if the end user is testing a delinquent collections challenger strategy on 10% of the strategic portfolio, only a small percentage of those accounts is delinquent. Because of the smaller sample size, it may take longer to observe the differences in the challenger results than with a larger sample. When a challenger strategy outperforms an existing champion, the end user may decide to assign the challenger to a greater percentage of the portfolio. This is accomplished by assigning the challenger strategy to a wider range of random digit groups.

Creating Comparable Digit Groups

Creating digit groups in equal intervals lets the end user compare champion and challenger strategies at-a-glance as illustrated in the following table. In general, it is easier to reserve a number, such as strategy ID 101, for use as a champion. This facilitates visual comparisons.

In Table 8, the first digit group range, 00-19, is the control group. All the strategy IDs point to champion strategies. The second digit group range introduces a credit line challenger. The third group pairs an authorizations challenger with the credit line challenger. The fourth digit group range pairs delinquent and overlimit collections challengers with champion strategies in the other decision areas. The last digit group range tests a reissue challenger.

TABLE 8

Digit Groups in Equal Intervals

| Digit Group | Credit Line | Delinquent Collections | Overlimit Collections | Authorizations | Reissue |
|---|---|---|---|---|---|
| 00-19 | Champion (101) | Champion (101) | Champion (101) | Champion (101) | Champion (101) |
| 20-39 | Challenger (120) | Champion (101) | Champion (101) | Champion (101) | Champion (101) |
| 40-59 | Challenger (120) | Champion (101) | Champion (101) | Challenger (410) | Champion (101) |
| 60-79 | Champion (101) | Challenger (230) | Challenger (320) | Champion (101) | Champion (101) |
| 80-99 | Champion (101) | Champion (101) | Champion (101) | Champion (101) | Challenger (525) |

With the exception of the collections strategies, the end user can compare any challenger to champion in a decision area, as well as compare the effects of multiple tests. For example, the end user can determine how much value the authorizations challenger adds to the credit line management challenger by comparing results between the two digit groups, 20-39 and 40-59, in the strategy performance reports. Without additional random digit groups, however, the collection strategies can only be analyzed as a pair, with the assignment set up this way.

Bypassing Champion/Challenger Testing

There are times when the end user may want to bypass the decision area logic. For example, the first month the system is in production, the end user may want to score accounts only and not provide treatment in the decision areas. To bypass system treatment for a decision area, set the strategy ID to 999 for that decision area. Strategy ID 999 tells the system not to process the account. It also sets a return indicator informing the host system to treat the account; that it was intentionally bypassed by the system.

Strategy Evaluation Tools

The system software provides five tools for evaluating strategies: the audit programs, estimators, cycle tally reports, scorecard reports, and strategy performance reports.

Audit Programs

The audit programs perform cross-checks for audit rules for fields and control tables. For example, if a scenario is referenced in a strategy, the audit program verifies that the scenario ID is entered in the appropriate scenario table. When all cross-checking is finished, each audit program produces an audit report for each table or an error report, if any have occurred. After the PCTMS audit program runs to successful completion, the end user can view the audit report on the PCTMS. If the audit detects errors during the PCTMS audit run, an audit error report displays where each error has occurred. FIG. 9 shows a sample strategy definition table in the PCTMS audit report.

Each time the end user makes changes within the PCTMS, no matter how small the change, it is necessary to run the audit program again. The PCTMS requires a clean audit run before it prepares estimator control parameters and generates the database files to be exported to the host.

The following discussion describes estimators and estimator control parameters. Run time for the audit program is negligible. After running a successful PCTMS audit, the PCTMS audit/export feature formats and saves the PC database files for export to the host system. The end user then works with the host system operator to upload the files to the host system. Protocols for moving between platforms vary.

The host system operator should then run the host system audit program for the uploaded control tables. This step completes the cross-table validation of audit rules and provides a safety net to ensure that the tables were moved successfully. It also provides a record of the production control tables.

In the preferred embodiment of the invention, the technical environment involves PCTMS and the upload files being transferred over the Internet to the host operating system for processing. The network involves browser software running locally on the end user's personal computer with a modem connection to an ISP (Internet Service Provider). Through secure channels, the data is routed to the data center and through the data center firewall coupling with the host system. Each connection from end user and the return of information from the host system follows the same Internet-based protocol.

Estimators

Estimators enable the end user to evaluate the impact of any changes to strategies or other control parameters before they are implemented. Each estimator produces a series of reports that are used in strategy development to forecast strategy outcomes, estimate the effects of strategies on operations, and analyze strategies for consistency.

Each estimator calculates and reports the estimated number and risk level of accounts for each row of key control tables. A separate estimator report can be produced on demand for each decision area. These can be generated at any time, but are typically run after the control tables have been uploaded onto the host system and make use of the historical data stored in the end user's report record file. Estimating the potential effect and results of strategies enables the end user make informed adjustments before implementing them into production The process for running estimators begins on the PCTMS. After running the PCTMS audit program, the end user has the option to change or confirm the parameters for the estimator reports. This is done in the estimator control dialog box. The PCTMS audit/export feature saves the estimator control parameters with the end user's export files.

The estimator control dialog box, shown in FIG. 10, enables the end user to do the following:

Designate a processing date.
Specify whether to realign behavior scores.
Specify whether to use holiday settings from authorizations scenarios.
Select report options to designate the SPIDs to be included and the roll-up format, or the way in which data are grouped (by SPID and digit group, by SPID only, or by strategy).
Select a report set.
Select report versions for the control tables to be represented.

When setting report options, the end user may select a specific SPID when a more detailed analysis of a strategy's impact is required. Generally, the strategy roll-up option best serves most needs.

Running Estimators

After the host system operator uploads the end user's PCTMS export files to the host system and runs the host system audit program, the estimators can be run using the control tables and the report record file.

Role of the Report Record File

On the host system, selected report records feed the estimator process. These are called base records and they were produced in prior production runs. Because the report record file is large, the end user may want to use only a subset for the estimator tallying process. Using the estimator sample percent field in the SPID control dialog box, the end user can select every record in the SPID for inclusion in the estimators or he can factor-down and choose a smaller percent, for example every 10th or every 25th record. Because this field is specific to each SPID, the end user can alter the number of records chosen by SPID. Regardless of the factoring percent you select, the estimator reports reflect a robust volume of accounts or transactions based on a corresponding multiplier.

Analyzing Estimator Results

The content of an estimator report varies across decision areas.

Estimators provide the following statistics for each decision area except authorizations:

Total number of accounts, number of scored accounts, and good/bad odds ratios for these accounts.

The authorizations estimator report provides the number of transactions, number of transactions with behavior scores, as well as corresponding odds. In addition, estimator reports provide such measures as balance, number of accounts with line changes, amount of line changes, and other information.

The good/bad odds ratio for each estimator is not based on actual performance, but rather on projected performance based on the odds-to-score relationship using the behavior score, and possibly the credit bureau risk score as well. Estimators only count those accounts with valid behavior scores in the ratio, and requires that the scores must fall within the minimum and maximum score settings.

The estimators produce a series of report versions, as selected in the estimator control dialog box. These options include: SPID control, strategy assignment, strategy (all decision areas), scenario (all decision areas), and table definition tables.

Strategy Performance Reports

Strategy Performance reports provide the ability to monitor strategy effectiveness by summarizing various delinquency, financial, and other performance measures. They also present a relative measure of strategy profitability. Because the reports are produced by digit group, it is easy to compare the various measures between champion and challenger strategies.

Some performance measures tracked are:
Number of current, active, inactive, and delinquent accounts.
Balance of current, active, and delinquent accounts.
Number of new charged-off and closed accounts.
Balance of new charged-off and closed accounts.
Merchandise purchase amounts for current and delinquent accounts.
Cash purchase amounts for current and delinquent accounts.
Finance charges and other fees.
Estimated profit per account and per active account.

By examining the measures on the report the end user can compare how each strategy contributes to monthly profit.

Report Layout

The system produces two strategy performance reports, one by SPID, digit group, and time on books; and one by SPID, digit group, and behavior score.

Row headings for both reports are identical. Column headings are different. The report by SPID, digit group, and time on books summarizes financial account data by the length of time the accounts have been open. The report by SPID, digit group, and behavior score summarizes current cycle financial account data by behavior score. The end user sets which behavior score to use, i.e. how many months ago, in the PCTMS using the strategy performance report field in the reporting options tab on the client parameters options dialog box. It is most common to set this so that the end user summarizes the behavior score from the beginning of the performance period.

For all industry types, a separate three-page strategy performance report is produced for each SPID and digit group combination defined in the strategy assignment dialog box on the PCTMS. A total report is produced for each SPID and across all SPIDs. Digit group ranges are not shown in the all SPID report because the digit group ranges can vary from SPID to SPID. The reports are produced once a month, although they can be produced on demand.

Strategy performance reports use cycle data stored in the report record file. The reports do not contain posting data. Because the reports contain sum-of-cycle data, and not point-in-time, month-end data, the numbers may not match with traditional month-end reports provided by systems external to the system. Another implication of this method of reporting is that reports are incomplete the first month after the system is installed, the first month a SPID is created from newly-acquired accounts, or the first month a new strategy is put in place.

Bankcard, Retail, & Mail Order Strategy Performance Report

The first page of the strategy performance report contains account and balance summary information. The second page contains additional balance summary information with balances split out between merchandise and cash. If the installation does not have cash lines or cash balances, the second page is suppressed. The third page contains delinquency rollover rates and balances, insurance and payment data, marketing letter data, fee data, behavior score data, average balance/performance ratios, and profit and risk numbers.

Report Sample: First Page

The first page of the strategy performance report contains account summary information for the digit group. Accounts are tallied by status categories such as open/closed, active/inactive, current/levels of delinquency, and charge-off/closed categories. The corresponding balances are also tallied.

The first page of the strategy performance report summarizes six general areas: Account Summary, New Charge-off Accounts, New Closed Accounts, Balance Summary, New Charge-off Balance, and New Closed Account Balance. Table 9 describes the fields that comprise each of these areas.

TABLE 9

Row Heading Fields in Page 1 of Strategy Performance Report

| Report Field | Description |
| --- | --- |
| Account Summary | Report section summarizing data by acitivity and delinquency level. |
| Total Accounts | Total number of accounts in each range in this digit group. This number includes active, inactive, and closed accounts, in both this cycle (as tallied below) and previous cycles. |
| Active Accounts | Number of accounts and percent of total accounts with a non-zero balance. These numbers include closed accounts with a balance. They do not include charged-off accounts or closed accounts with a non-zero balance. |
| Inactive Open Accounts | Total number of open accounts and percent of total accounts with a zero billed balance. Charged-off and closed accounts are not included in these numbers. |
| Current Accounts | Total number of active accounts and percent of total accounts that are neither delinquent nor charged off. |
| 1 Cycle, 2 Cycle, 3 Cycle, and 4+ Cycle Accounts | Total number of accounts and percent of active accounts that are one-cycle, two-cycle, three-cycle, and four or more cycle delinquent but not charged off. |
| New Charge-off Accounts | Report section summarizing the number of accounts charged off this cycle. Old charge-off accounts are not tallied in this report. |
| Bankrupt | Total number of accounts charged off due to bankruptcy this month. |
| Fraud | Total number of accounts charged off due to fraud this month. |
| Other | Total number of accounts charged off due to reasons other than bankruptcy or fraud (for example, delinquent aging) this month. |
| New Closed Accounts | Report section summarizing data about accounts closed this cycle. Old closed accounts are tallied in Total Accounts but are not tallied in this section. |
| Voluntary | Total number of accounts closed voluntarily by the customer this cycle. |
| Other | Total number of accounts closed this cycle for reasons other than voluntary. |
| Balance Summary | Report section summarizing balance data by activity status and delinquency level. Balances are expressed in currency units; (000) means multiply the number by 1000. |
| Total Balance | Sum of the statement balances in thousands and average statement balance for all accounts that are not charged off. |
| Current Balance | Sum of the statement balances in thousands, average statemeat balance, and percent of total statement balance for non-delinquent accounts that are not charged off. |

TABLE 9-continued

Row Heading Fields in Page 1 of Strategy Performance Report

| Report Field | Description |
| --- | --- |
| 1 Cycle, 2 Cycle, 3 Cycle, and 4+ Cycle Total Balance | Sum of the statement balances, average statement balance, and percent of total statement balance for 1-cycle, 2-cycle, 3-cycle, and 4+ cycle delinquent accounts that are not charged off. |
| New Charge-off Balance | Report Section summarizing balance data for accounts charged off this cycle. |
| Bankrupt Total | Sum of the statement balances and average statement balance for accounts that were charged off due to bankruptcy this month. |
| Fraud Total | Sum of statement balances and average statement balance for accounts that were charged off due to fraud this month. |
| Others Total | Sum of the statement balances and average statement balance for accounts that were charged off for reasons other than bankruptcy or fraud this month. |
| New Closed Account Balance | Report section summarizing the balances of accounts closed this cycle for the reasons listed below. |
| Voluntary | Sum of the statement balances for accounts closed voluntarily by the customer this cycle. |
| Other | Sum of the statement balances for accounts closed this cycle for reasons other than voluntary closure. |

Report Sample: Second Page

The second page of the strategy performance report contains balance summary information for the digit group. This page is printed only if there are separate cash balances as indicated by the cash line reporting field on the reporting options tab in the client parameters options dialog box in the PCTMS. Balances are tallied in the merchandise or cash sections. Within each section, balances are reported by delinquency level, charge-off status, and closure categories.

The second page of the strategy performance report for bankcard, mail order, and retail industry types divides account balances and counts into two broad categories: merchandise and cash purchases. Within each category, the balances are summarized by delinquency level. Balances are provided for new charge-off accounts and new closed accounts. Table 10 describes the fields that comprise each of these areas.

TABLE 10

Row Heading Fields in Page 2 of Strategy Performance Report

| Report Field | Description |
| --- | --- |
| Merchandise Balance Summary | Report section summarizing balances by activity status and delinquency level, calculated using current month billed balance minus current month billed cash balance. The difference is the merchandise balance. Balances are expressed in currency units; (000) means multiply the number by 1000. |
| Total Balance | Total merchandise balance and average merchandise balance of accounts in each range. The balance includes active, inactive, and current-cycle closed balances for accounts that are not charged off. |
| Current, 1 Cycle, 2 Cycle, 3 Cycle, and 4+ Cycle | Total merchandise total balance, average balance, and percent of total balance for current (non-delinquent), one-cycle, two-cycle, three-cycle, and four or more cycle delinquent accounts in each range. |
| Total New Charge-off | Report section summarizing merchandise balances charged off this cycle. This amount includes charge-off balances due to bankruptcy, fraud, and other reasons. |
| Bankrupt | Total merchandise balance charged off due to bankruptcy. |
| Fraud | Total merchandise balance charged off due to fraud. |
| Others | Total merchandise balance charged off due to reasons other than bankruptcy or fraud. |
| Total New Closed | Report section summarizing merchandise balances for accounts closed this cycle. |
| Voluntary Closed | Total merchandise balance of accounts closed voluntarily this cycle. |
| Other Closed | Total merchandise balance of accounts closed this cycle for reasons other then voluntary closure. |
| Cash Balance Summary | Report section summarizing cash balance data by activity status and delinquency level. Balances are expressed in currency units; (000) means multiply the number by 1000. |

TABLE 10-continued

Row Heading Fields in Page 2 of Strategy Performance Report

| Report Field | Description |
| --- | --- |
| Total Balance | Total cash balance and average cash balance of accounts in each range. The balance includes active, inactive, and current-cycle closed balances for accounts that are not charged off. |
| Current, 1 Cycle, 2 Cycle, 3 Cycle, and 4+ Cycle | Total cash total balance, average cash balance, and percent of total cash balance for current (non-delinquent), one-cycle, two-cycle, three-cycle, and four or more cycle delinquent accounts in each range. |
| Total New Charge-off | Report section summarizing cash balances charged off this cycle. This amount includes charge-off balances due to bankruptcy, fraud, and other reasons. |
| Bankrupt Total | Total cash balance of accounts charged off this cycle due to bankruptcy. |
| Fraud Total | Total cash balance of accounts charged off this cycle due to fraud. |
| Others Total | Total cash balance of accounts charged off this cycle due to reasons other than bankruptcy or fraud. |
| Total New Closed | Report section summarizing cash balances for accounts closed this cycle. |
| Voluntary Closed | Total cash balance of accounts closed voluntarily this cycle. |
| Other Closed | Total cash balance of accounts closed this cycle for reasons other than voluntary closure. |

Report Sample: Third Page

The third page of the strategy performance report for bankcard, mail order, and retail industry types contains delinquency rollover rates and balances, sales and payment data, credit line utilization and exposure data, fee data, behavior score data, average balance/performance ratios (cleverness indices), and profit and risk numbers.

All balances are derived from statement balances. Balances are shown as factored in parentheses; for example, in the sample reports below, total exposure should be multiplied by 1000.

The third page of the strategy performance report for bankcard, mail order, and retail industry types divides account balances and counts into the following six categories: Delinquency Rollover, Sales/Payments, Credit Line, Fee Data, Behavior Score Data, and Profit/Risk. Table 11 describes the fields that comprise each of these areas.

TABLE 11

Row Heading Fields in Page 3 of Strategy Performance Report

| Report Field | Description |
| --- | --- |
| Delinquency Rollover | Report section summarizing delinquency transition activity. |
| Current/1 Cycle, 1 Cycle/2 Cycle, 2 Cycle/3 Cycle, and 3 Cycle/4 Cycle Accounts | Total number and total balance of non-charged-off accounts that were: Current during the previous billing cycle and progessed to one-cycle delinquent as of this cycle. One-cycle delinquent during the previous billing cycle and progressed to two-cycles delinquent as of the current cycle. Two-cycles delinquent during the previous billing cycle and progressed to three-cycles delinquent as of the current cycle. Three-cycles delinquent during the previous billing cycle and progressed to four cycles delinquent as of the current cycle. |
| Sales/Payments | Report section summarizing sales and payment information for the cycle. |
| Accounts with Debit | Total number of accounts with debit activity shown on the statement. |
| Cash Sales | Total amount of cash advances shown on the statement. |
| Merchandise Sales | Total amount of merchandise sales shown on the statement. |
| Average Total Sales | Average sales (merchandise and cash) shown on the statement. |
| Total Payments | Total amount of payments posted on the statement. |
| Payment/Balance | Ratio of payments to previous balance on the statement. |
| Non-Payment Credits | Total amount of non-payment credits shown on the statment. |
| Finance Charges | Total amount of interest charged to accounts. |
| Profit/Risk | Report section summarizing profit and risk numbers. |
| Estimate Profit | Estimated profit contribution of accounts in each range. Example: Estimated Profit = (Net Interchange Fees + Fees + Interest) minus (Cost of Funds + Net Credit Loss + Collection Expense + Delivery Expense). The calculation may be modified for your installation. For your profit calculation, see your TRIAD Project Guide. |

TABLE 11-continued

Row Heading Fields in Page 3 of Strategy Performance Report

| Report Field | Description |
|---|---|
| Estimated Profit/ Account | Estimated profit contribution per account in each months-on-books or behavior score range. |
| Estimated Profit/ Active | Estimated profit contribution per active account in each months-on-books or behavior score range. |
| Balance-at-Risk/ Receivable | Ratio of the balance-at-risk to the total balance for non-charged-off accounts by range. All unscored accounts have their entire balance included in the balance-at-risk. |
| Credit Line | |
| Average Amount Overlimit | Average over-limit amount of over-limit accounts. |
| Overlimit Amount/ Overlimit Balance Percentage | Percent of total account balance over limit for over-limit accounts. |
| Fee Data | Report section summarizing the fee revenue being tracked. |
| Fees 1 through 4 | Total amount of annual fees billed. You can set and edit the fee labels for the report in General Options tab in the Client Parameters - Options dialog box in the PCTMS. |
| Behavior Score Data | Report section summarizing behavior score data. |
| Accounts Scored | Total number of scored and retained accounts this cycle. Typically excludes Payment Projection scored accounts. |
| Average Score | Average behavior score for accounts within each range. Typically excludes Payment Projection scored accounts. |
| Average Balance by Performance Ratio | Report section summarizing Average Balance by Performance Ratios, also known as cleverness indices. |
| 1 Cycle/Current 2 Cycle/Current 3 Cycle/Current 4+ Cycle/Current | Ratio of the average statement balance of one-cycle, two-cycle, three-cycle, and four or more cycle delinquent accounts to the average balance of current accounts. Note: The lower the ratio, the better the strategies are performing. |

Installment Strategy Performance Report

The first page of the Installment loan strategy performance report contains account and balance summary information. The second page contains balance summary information for the digit group, tallied in two balance split sections. These two user-defined categories can represent such splits as interest bearing vs. interest free accounts, directly managed vs. affinity accounts, accounts acquired directly vs. accounts introduced by agents, or short term vs. long term accounts. The third page of the report contains delinquency rollover rates and balances, insurance and payment data, marketing letter data, fee data, behavior score data, average balance/performance ratios, and profit and risk numbers.

Report Sample: First Page

The first page of the installment loan strategy performance report contains account summary information for the digit group. Accounts are tallied by status categories such as open/closed, active/inactive, current/levels of delinquency, and charge-off/closed categories. The corresponding balances are also tallied.

The first page of the installment loan strategy performance report summarizes six general areas: Account Summary, New Charge-off Accounts, New Closed Accounts, Balance Summary, New Charge-off Balance, and New Closed Account Balance.

Report Sample: Second Page

The second page of the installment loan strategy performance report contains balance summary information for the digit group. Balances are tallied in the two user-defined sections. Within each section, balances are reported by delinquency level, charge-off status, and settlement status.

The second page of the installment loan strategy performance report summarizes balance, charge-off, and closed account status information for two splits defined for the end user installation.

Report Sample: Third Page

The third page of the installment loan strategy performance report contains delinquency rollover rates and balances, insurance and payment data, marketing letter data, fee data, behavior score data, average balance/performance ratios, and profit and risk numbers.

The third page of the strategy performance report for installment loan industry type divides account balances and counts into the following six categories: Delinquency Rollover, Insurance/Payments, Miscellaneous, Fee Data, Behavior Score Data, and Profit/Risk.

Credit Line Management

The credit line management decision area, also known as credit line, determines changes in credit line accounts and may be configured to determine changes in a cash line and two additional lines. Every account is reviewed at cycle for eligibility for credit line review. The review can result in an increase in the line, a decrease in the line, or no change to the line. A series of timing triggers control when a non-delinquent account is eligible for a credit line review. Delinquent accounts are not bound by timing parameters and are reviewed at each cycle. The system generates reports that analyze limits in terms of account behavior, line utilization, and actions taken. These reports are based on information in the report record file, a repository containing all actions taken. The credit line estimator report shows how a sample group of accounts reacts to the strategies that currently have under development.

Table 12 summarizes the components of the credit line management decision area. If the cash line or the additional lines are used in the installation, the end user has the option to set each of these lines to be either dependent on or independent of the credit line. If any of these lines are dependent on the credit line, the multiplier for the dependent line is calculated against the main credit line.

TABLE 12

Credit Line Management Decision Area Components

| Component | Description |
| --- | --- |
| Decision Area Timing | Actions occur only at cycle. |
| Credit Line Options | Configure Credit Line processing for your installation via the PCTMS. |
| Exclusions | Identify account categories that are not processed in the Credit Line decision area. |
| Trigger Events | Determine timing for Credit Line reviews. |
| Strategies | Evaluate accounts and assign the appropriate scenario. |
| Scenarios | Specify actions to be taken on an account. |
| Decreasing a Non-delinquent Account | Allows decreasing the limit of a non-delinquent account. |
| Outcomes Reporting | Tallies and reports actions taken during the month. |
| Estimator Reporting | Shows potential new exposure levels based upon the new strategies under development and provides a count of the scored accounts and associated odds for each row of the Stratgey, Scenario, SPID Control, Strategy Assignment, and Strategy Definition control tables. |

Delinquent Collections

The system can act on delinquent accounts at cycle and throughout the month. It responds to changes in factors such as delinquency level or account balance and tailors actions to fit the new status. Risk evaluation is a primary element in delinquent collections decisions. Evaluating based on risk, the end user can accelerate and decelerate entry into collections, and out-place problem accounts quickly. This also allows the end user to use less expensive collection methods, such as letters, for accounts that have a high probability of curing on their own. The timing events that cause an account to be processed in the delinquent collections decision area are part of the calling program.

When an account is delinquent at cycle, the system assigns a set of scenario triggers or actions to be taken throughout the month. Actions occur relative to cycle date. Actions assigned to Day 0 take place at cycle. Actions assigned to Day 7 take place seven days after cycle, and so forth. If an account does not cure its delinquency and nothing else about the account changes, the system follows the actions in the scenario assigned at cycle. This is the normal course of events for a delinquent account.

If the balance increases during the cycle, or the delinquency level changes, the system responds to these situations by re-examining the account and assigning new actions. This process is called dynamic reclassification. It can move the account to a more severe or a less severe scenario, depending on the account's change in profile. If the change in status results from a returned payment, for example, the system can respond to the situation with a special set of actions.

The PCTMS provides a list of reclass triggers for the selection. The end user can select the reclass triggers to use, and the order in which they are applied. The reclass trigger dialog box also includes a "user-defined up" and "user-defined down" reclass trigger, allowing the end user to trigger reclass events beyond the defined list of triggers. A report record file: dynamic reclassification and report record can identify if the account was reclassed up (U) or down (D). The report record can also assist with reclass identification and testing. Table 13 shows the components of the delinquent collections decision area.

TABLE 13

Components of Delinquent Collections Decision Area

| Component | Description |
| --- | --- |
| Decision Area Timing | Actions can take place at cycle or daily posting. |
| Delinquent Collections Options | Configure Delinquent Collections processing for your installation via your PCTMS. |
| Exclusions | Identify account categories that are not processed in the Delinquent Collections decision area. |
| Strategies | Evaluate accounts and assign the appropriate scenario. |
| Scenarios | Specify actions to be taken on an account. |
| Dynamic Reclassification | Re-examines on account at posting if its delinquency status or balance has changed during the cycle. A reclassified account may move into a scenario of greater or lesser severity depending on the direction of change. |
| Outcomes Reporting | Tallies and reports actions taken during the month. |
| Performance Reporting | Tallies transitions in delinquency from the previous to the current cycle. The transitions may be from a greater to a lesser level of delinquency or vice versa. |
| Estimator Reporting | Provides a count of the scored accounts and associated odds for each row of the Strategy, Scenario, SPID Control, Strategy Assignment, and Strategy Definition control tables. |

Overlimit Collections

The overlimit collections decision area treats accounts that are over limit but not delinquent. Accounts that are both over limit and delinquent are treated in the delinquent collections decision area. The system takes action on overlimit accounts at cycle and through-out the month. Table 14 shows the components of the overlimit collections decision area.

TABLE 14

Components of Overlimits Collections Decision Area

| Component | Description |
| --- | --- |
| Decision Area Timing | Actions can take place at cycle or daily posting. |
| Overlimit Collections Options | Configure Overlimit Collections processing for your installation. Overlimit Collections decision area. |
| Trigger Events | Determine timing for an action set to be taken. |
| Strategies | Evaluate accounts and assign the appropriate scenario. |
| Scenarios | Specify actions to be taken on an account. |
| Outcomes Reporting | Tallies and reports actions taken during the month. |
| Estimator Reporting | Provides a count of the scored accounts and associated odds for each row of the Strategy, Scenario, SPID Control, Strategy Assignment, and Strategy Definition control tables. |

All non-excluded accounts are processed through a series of user-defined filters, called triggers. When a trigger activates a review, the system searches the strategy table, retrieves the appropriate scenario, and returns the actions to the calling program for implementation.

If the system takes over-limit actions at cycle and a new credit line has been calculated, it uses the new credit line as a base for the line utilization calculation and in the calculations that determine breakpoint crossing. Each overlimit collections scenario is a unique event with one set of actions.

This contrasts with delinquent collections, which may have up to three sets of actions in a single scenario. Breakpoints function in overlimit collections the same way that dynamic reclassification works in delinquent collections. Both can trigger an updated response to a changing account situation.

Authorizations Management

The authorizations decision area helps the end user make authorization decisions about transactions that present both opportunity and risk. These transactions belong to accounts that are at a low level of delinquency or are over limit, conditions that may previously have been the cause for an automatic decline. Table 15 shows the components of the authorizations decision area.

Timing triggers or events that cause an account to be processed in the authorizations decision area are part of the calling program.

Scenario triggers are part of the authorizations decision area.

There is more to managing authorizations than accepting, declining, or referring a transaction. The system also calculates user-defined exposure parameters known as cushions. In the PCTMS, the end user can set the parameters for calculating different cushion amounts for cash and credit (merchandise) transactions, as well as for holiday and non-holiday periods.

The end user can also define one supplemental action for accepted transactions and up to three supplemental actions for declined or referred transactions.

As with the other decision areas, authorizations records its actions for reporting purposes. The system returns a record of each decision it makes to be added to the host authorization log file. At a later time, either daily, weekly or once a month, the system reads the authorization log file and creates reporting files. The reporting programs create summary and outcomes reports for the authorizations decision area. There is also a transaction-based estimator report. The PCTMS enables the end user to maintain transaction types, transaction report types, status types, and status report types in separate tabs in the authorizations options dialog box. This dialog box enables the end user to define up to 100 transaction and account status types and how they are grouped together for reporting purposes.

The accept, decline, or refer decision occurs during transaction processing. But other actions at other times also support the decision-making process:

- After a new account is opened and a random digit is assigned, an authorizations call may be made to the system to assign a SPID and an authorizations strategy ID.
- During cycle processing, each account is assigned a SPID and an authorizations strategy ID.
- At authorization time, selected accounts may be assigned an authorizations strategy ID.
- At reporting, the actions are tallied and reported.

Table 15 shows the components of the authorizations decision area.

TABLE 15

Authorizations Decision Area

| | |
|---|---|
| Decision Area Timing | Actions may be driven by transaction or batched nightly. |
| Authorizations Options | Configure Authorizations processing for your installation. |
| Exclusions | Identify account categories that are not processed in the Authorizations decision area. |

TABLE 15-continued

Authorizations Decision Area

| | |
|---|---|
| Strategies | Evaluate accounts and transactions and assign the appropriate scenario. |
| Scenarios | Specify actions to be taken on selected transactions. |
| Outcomes Reporting | Tally actions taken during the month, including a summary of decisions made by TRIAD and the host system. |
| Estimator Reporting | Provides a count of the transactions and associated account odds for each row of the Strategy, Scenario, SFIP Control, Strategy Assignment, and Strategy Definition control tables. |

Reissue Management

In the reissue management decision area, the system reviews an account to determine whether to reissue a card and for what length of time. Accounts can be reviewed multiple times before and after the card expiration date. By using multiple reviews, the end user can encourage cardholders to modify their behavior as a condition of reissuance. For example, before the reissue date, the end user can encourage customers with inactive accounts to reactivate. Or, they can tell customers whose cards are not reissued what they must do to re-establish the account.

Reissue management is normally scheduled as part of the monthly processing, but it can also be run on-demand. In either case, the processing methodology is the same.

All non-excluded accounts are processed through a series of filters called triggers, based on expiration date. When a trigger activates a review, the system searches the strategy table, retrieves the appropriate scenario, and returns the prescribed actions to the calling program for implementation. Table 16 shows the components of the reissue management decision area.

TABLE 16

Components of Reissue Management Decision Area

| Component | Description |
|---|---|
| Trigger Events | Signal the time for an account to be reviewed. |
| Strategies | Evaluate accounts and assign the appropriate scenario. |
| Scenarios | Specify actions to be taken on an account. |
| Outcomes Reporting | Tallies and reports actions taken during the month. |
| Estimator Reporting | Provides a count of the scored accounts and associated odds for each row of the Strategy, Scenario, SPID Control, Strategy Assignment, and Strategy Definition control tables. |
| Decision Area Timing | Actions can be taken as part of cycle or on demand, depending on installation-specific schedules. |
| Reissue Management Options | Configure Reissue Management processing for your installation. |
| Exclusions | Identify account categories that are not processed in the Reissue Management decision area. |

Marketing Communications

The marketing communications decision area allows the end user to increase his ability to cross-sell products, enhance customer relations, and retain customers. Marketing communications helps the end user to evaluate and better judge what brings the best returns on each marketing campaign.

The marketing communications decision area can be a regularly scheduled part of the normal cycle processing or it can be run on-demand. In either case, the processing methodology is the same. Non-excluded accounts are processed through a series of filters or triggers. For an account to be assigned a marketing communications scenario, it must first satisfy all trigger criteria. If it does, the system searches the strategy table, retrieves the scenario, and returns the actions to the calling program for implementation.

The end user can select up to fifteen keys from the Keys library as triggers for each marketing communication strategy. A different set of 15 decision keys can be selected as strategy keys for each strategy. Additionally, the end user can assign up to five marketing communications strategies per SPID and random digit group, and the PCTMS enables the end user to assign each strategy to a billing call or standalone call.

Using the strategy assignment settings the end user enters in the strategy assignment dialog box, the system loops through each strategy checking the call type for possible execution. Using this flexibility, the end user can run multiple marketing campaigns during the month. Table 17 shows the components of the marketing communications decision area.

TABLE 17

Components of Marketing Communications Decision Area

| Component | Description |
| --- | --- |
| Decision Area Timing | Actions can be taken as part of cycle or on demand, depending on installation-specific schedules. |
| Marketing Communication Options | Configure Marketing Communications processing for your installation. Some options which are not discussed in this chapter are set at project initiation. For settings used in your installation, see your TRIAD Project Guide. |
| Exclusions | Identify account categories that are not processed in the Marketing Communications decision area. |
| Trigger Events | Signal the time or circumstances for a Marketing Communications review. |
| Strategies | Evaluate accounts and assign the appropriate scenario. |
| Scenarios | Specify actions to be taken on an account. |
| Outcomes Reporting | Tallies and reports actions taken during the month. |
| Estimator Reporting | Provides a count of the scored accounts and associated odds for each row of the Strategy, Scenario, SPID Control, Strategy Assignment, and Strategy Definition control tables. |

Performance-Based Pricing

The performance-based pricing decision area, also known as repricing, allows the end user to adjust an account's pricing structure and control product offerings based on account performance. Using strategic filtering and grouping of accounts, the end user can adjust account values such as the annual percentage rate (APR), annual fee, and other fees based on account history. This enables the end user to reduce rates on low risk, profitable accounts and increase rates on high risk, unprofitable accounts. Overall, the flexibility of the performance-based pricing decision area enables the end user to anticipate customer needs to control attrition.

The performance-based pricing decision area can be a regularly scheduled part of normal cycle processing or it can be run on-demand. In either case, the processing methods are the same.

All non-excluded accounts are processed through a series of filters or triggers. For an account to be assigned a performance-based pricing scenario, it must first satisfy all of the trigger criteria. If it does, the system searches the strategy table, retrieves the scenario, and returns the actions to the calling program for implementation. The end user can select up to 15 keys from the keys library as triggers for each performance-based pricing strategy. A different set of fifteen decision keys can be selected as strategy keys for each strategy. Table 18 shows the components of the performance-based pricing decision area.

TABLE 18

Components of Performance Pricing Decision Area

| Component | Description |
| --- | --- |
| Decision Area Timing | Actions can be taken as a part of cycle or on demand, depending on installation-specific schedules |
| Performance-based Pricing Options | Performance-based Pricing processing for your installation. |
| Exclusions | Identify account categories that are not processed in the Performance-based Pricing decision area. |
| Trigger Events | Signal the time or circumstances for a Performance-based Pricing review. |
| Strategies | Evaluate accounts and assign the appropriate scenario. |
| Scenarios | Specify actions to be taken on an account. |
| Outcomes Reporting | Tallies and reports the actions taken during the month. |
| Estimator Reporting | Provides a count of the scored accounts and associated odds for each row of the Strategy, Scenario, SPID Control, Strategy Assignment, and Strategy Definition control tables. |

The PC Table Maintenance System (PCTMS)

The PC table maintenance system (PCTMS) is the front-end component of the system. Installed on the end user's PC, it enables the end user to maintain the control tables that are used by the account management engine component running on the host system. The PCTMS is where the end user develops strategy trees, as well as SPID assignment and scorecard assignment trees, representing the decision logic for how the system manages accounts. The PCTMS also contains the client-level and decision area-level parameters and options that enable the end user to optimize the installation.

In addition, the PCTMS includes scorecard manager, a facility that enables the end user to view scorecard data and (optionally) update or add new scorecards.

Navigation Features

Figure 11:
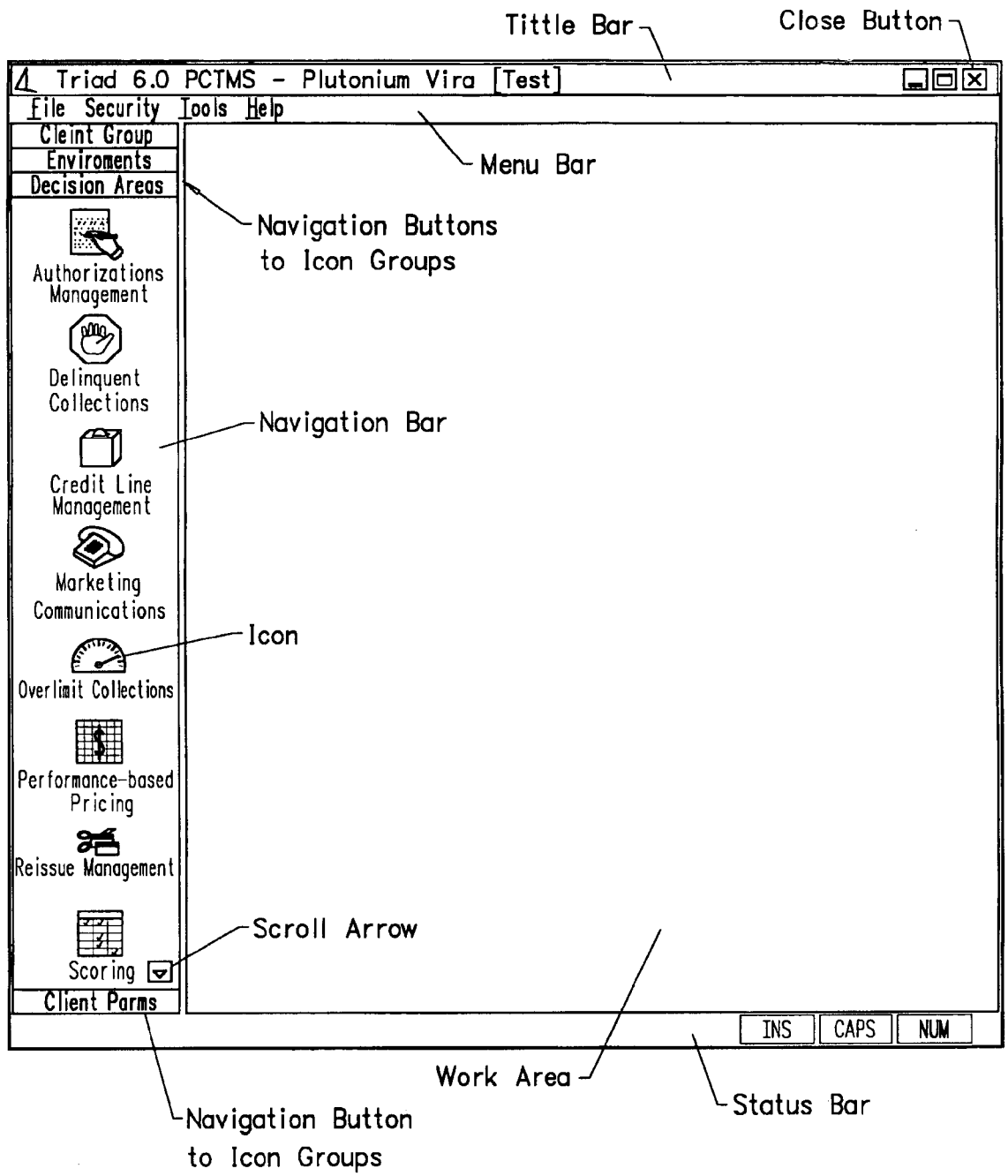
FIG. 11 is a screen showing PCTMS navigation features according to the invention.

FIG. 11 shows the features used for PCTMS screen navigation. The PCTMS title bar includes the client name and environment the end user currently has open. Menu bar options from a blank work area include File (for environment administration and client administration for multi-client installations, Security (for User Administration and changing passwords), Tools (for System and Audit/Export features), and Help. Menu bar options when the end user opens a dialog box in the PCTMS include File, View, and Help.

Icon Groups

Icon groups are sets of icons that appear in the navigation bar in the PCTMS. If the end user does not have editing permission for an area of the PCTMS, he will be able to open and view, but not make changes in that area. Security permission in the PCTMS is maintained by the PCTMS system administrator.

Client Group Icon Group

This icon group appears upon opening a multi-client version of the PCTMS, and contains icons for each client defined on the PCTMS. If the end user has a single-client version, this icon group is not visible.

Environments Icon Group

Accessed from the environments navigation bar button at the top of the PCTMS navigation bar, this icon group contains icons for opening defined environments in the PCTMS. The PCTMS environments enable the end user to mirror the environments in use on the host system. When the end user opens the PCTMS, the PCTMS opens the main editing environment that is associated with testing.

Decision Areas Icon Group

This icon group appears upon opening a single-client version of the PCTMS, and contains one icon for each decision area. Each installation of the system has one or more of the following icons:

Authorizations Management
Delinquent Collections
Credit Line Management
Marketing Communications
Overlimit Collections
Performance-based Pricing
Reissue Management
Scoring
Individual Decision Area Icon Groups Accessed from the decision areas icon group, these icon groups contain icons for the strategies window for each decision area, as well as icons for the decision area options, strategy parameters, scenarios, and other decision area dialog boxes, as applicable.

Scoring Icon Group

Accessed from the decision areas icon group, the scoring icon group contains icons for opening the scorecard assignment window, the scorecard exclusion and retain reasons and scoring options dialog boxes, and scorecard manager.

Client Parms (Client Parameters) Icon Group

Accessed from the client parms button at the bottom of the PCTMS navigation bar, this icon group contains icons for opening the strategy assignment, client parameters options, report ranges, and scenario action labels dialog boxes, as well as the SPID and libraries icon groups.

The SPID icon group contains icons for accessing the SPID assignment window and SPID control dialog box.

The libraries icon group contains icons for accessing the exclusions, keys, block codes, and collection Indicators dialog boxes.

Decision Area Functions

Decision areas are where the end user does the majority of work in the PCTMS. The scenarios, strategies, and decision area options on the PCTMS comprise critical settings for how the system processes accounts. The end user accesses these options from each of the decision area icon groups.

The following discussion covers procedures for how to:
View, edit, add, rename, and delete scenarios.
Open strategy parameters and decision area options dialog boxes.
Assign Delinquent Collections reclassification triggers.
Add and delete entries in the Authorizations—Options dialog box tabs (transaction and status types, and transaction and status report types).

To View, Edit, Add, Rename, and Delete Scenarios:

1. Navigate to the decision area icon group for the decision area in which to work.

2. Click the scenarios icon. The PCTMS opens the decision area scenarios dialog box. Each decision area contains a unique scenarios dialog box. See the following list to locate an example and field descriptions for each decision area scenarios dialog box.

3. Select the scenario to view, edit, rename, or delete in the scenario ID drop-down list. To create a new scenario from a copy of an existing scenario, select the scenario to copy.

4. The following can be done:
To edit any of the scenario fields, change the field information as required.
To add a scenario, choose File>New Scenario on the PCTMS menu bar (or right-click within the dialog box to access the shortcut menu) and enter a new scenario ID and name in the add new scenario dialog box. Valid IDs are from 1 to 999, and valid names are 25 characters long. To copy scenario parameters from the scenario currently in view in the scenarios dialog box, choose the copy currently selected scenario check box. Click OK and edit the field values in the new scenario as required.
To rename an existing scenario or renumber a scenario ID, choose File>Rename scenario on the PCTMS menu bar (or right-click within the dialog box to access the shortcut menu) to open the rename scenario dialog box. Edit the name or ID and click OK to rename or renumber the scenario.
To delete an existing scenario, choose File>Delete scenario on the PCTMS menu bar (or right-click within the dialog box to access the short-cut menu). The PCTMS displays a message box asking the end user to confirm that he wants to delete the specified scenario. Click OK to delete the scenario.

5. Click apply in the scenarios dialog box to save changes while working. When finished, click OK to close the scenarios dialog box and return to a blank work area in the decision area.

To View and Edit Strategy Parameters and Decision Area Options

Note: Not all decision areas have strategy parameters and options dialog boxes.

1. Navigate to the decision area icon group for the decision area in which to work.

2. Click the strategy parameters or the options icon, as required. The PCTMS opens the selected dialog box for the decision area in which the end user is working. Each decision area dialog box contains unique strategy parameters and option fields.

3. To edit the fields in one of the decision area options dialog boxes, see the following table to locate field descriptions for each decision area. Note: The reissue management, marketing communications and performance-based pricing decision areas do not have options dialog boxes.

4. To edit the fields in one of the decision area strategy parameters dialog boxes, see the following instructions based on the selected decision area. Note: The authorizations and delinquent collections decision areas do not have strategy parameter dialog boxes.

Credit Line Management

Select a strategy in the strategy ID drop-down list and edit the fields in the dialog box as required.

Overlimit Collections

Select a strategy in the strategy ID drop-down list. Edit the fields in the dialog box as required. Percent utilization breakpoints 2 through 6 must be entered in ascending order. Set any unused break-points to the same value as the last breakpoint used.

Reissue Management

Select a strategy in the strategy ID drop-down list. Enter review points in descending order starting from the review points field 1. Use positive numbers for review points before expiration and negative numbers for review points after expiration. Enter 0 to designate a review point at expiration. If less than six review points are used, leave any unused fields blank.

Marketing Communications and Performance-based Pricing

Select a strategy in the strategy ID drop-down list and change the selected triggers or edit the usage and valid value limit fields as required.

To add a trigger, highlight the desired trigger in the library list and click add.

To move the trigger up or down within the trigger hierarchy, highlight a trigger in the selected triggers list and click the up or down arrow.

To remove a trigger from the selected triggers list, highlight the trigger and click the remove button.

To edit the usage, low value, or high value fields, highlight a trigger in the active triggers list and change the information as required.

5. Click apply to save changes while working. When finished, click OK to close the dialog box and return to a blank work area in the decision area.

To Assign Delinquent Collections Reclassification Triggers

1. Navigate to the delinquent collections decision area and click the reclass triggers icon.

2. The following can be done:

To add a trigger, select the trigger from the trigger library list and click add.

To remove a trigger, select the trigger from the selected triggers list and click remove.

To change the hierarchy of a trigger, select the trigger in the selected triggers list and use the arrow buttons to move the trigger up or down.

3. Click apply to save changes while working. When finished, click OK to close the dialog box and return to a blank work area in the decision area.

To Add, Edit, or Delete Authorizations Transaction or Status Type Entries

1. Navigate to the authorizations decision area and click the options icon. The PCTMS opens the authorization options dialog box.

2. Select the transaction types or status types tab, as required.

3. If in the transaction types tab, the following can be done:

To add an entry, choose File>New on the PCTMS menu bar (or position the cursor in the entry list and right-click to access the shortcut menu). In the newly-created range, edit the value in the range low field as required. Enter a description in the label field and choose the credit or cash designation in the credit/cash drop-down list, then select a report type in the report type drop-down list.

To edit an entry, highlight the entry and change the information in the range low, label, credit/cash, or report type field.

To delete an entry, highlight the range to delete, and choose File>Delete on the PCTMS menu bar (or right-click to access the short-cut menu).

4. If in the status types tab, the following can be done:

To add an entry to the list of cycles delinquent status ranges, highlight a range of more than one cycle and choose File>New on the PCTMS menu bar (or position your cursor anywhere in the entry list and right-click to access the shortcut menu). The PCTMS adds a new cycles delinquent entry below the highlighted entry, splitting the cycles delinquent range. Edit the value in the active range low field as required.

To add an entry to the list of utilization level status ranges, highlight a utilization level range within a cycles delinquent entry and choose File>New on the PCTMS menu bar (or position the cursor anywhere in the entry list and right-click to access the shortcut menu). The PCTMS adds a new utilization level entry below the highlighted entry, splitting the utilization level range.

To edit an entry, highlight a cycles delinquent or utilization level range and change the information in the range low as required, followed by the tab key. The report type field can only be edited if the utilization level range highlighted.

Keep in mind the following:

The dialog box tab allows you to expand (+) and collapse (−) each cycles delinquent entry to view or hide the utilization Level entries.

The PCTMS does not allow one to edit the range low value in an entry starting with a 0.

If the end user adjusts the range low value, the PCTMS adjusts the high range value of the previous entry automatically.

To delete an entry, highlight the cycles delinquent or utilization level range to delete (other than the range starting with 0), and choose File>Delete on the PCTMS menu bar (or right-click to access the short-cut menu). The PCTMS deletes the highlighted entry and adds the deleted range to the range of the previous entry.

5. Click apply to save changes while working. When finished, click OK to close the dialog box and return to a blank work area in the decision area.

To Add or Edit Authorizations Transaction or Status Report Types

1. Navigate to the authorizations decision area and click the options icon. The PCTMS opens the authorization options dialog box.

2. Select the transaction report types or status report types tab as required.

3. Highlight a report row and enter or change the entry in the report type label field as required.

4. Click apply to save changes while working. When finished, click OK to close the dialog box and return to a blank work area.

Client-Level Settings

The following discussion provides field descriptions and procedures for the following two areas in the PCTMS:

Scoring options and exclusion/retain reasons dialog boxes in the scoring icon group.

Strategy assignment, client parameter options, SPID control, exclusions, keys, block codes, collection indicators, report ranges, and scenario action labels dialog boxes in the client parms icon group.

Scoring Options

The scoring options dialog box contains control fields for setting the scoring and historical constants. Access the dialog box in the scoring icon group (accessed from the decision areas icon group) in the PCTMS navigation bar. Scoring options are grouped into the following four tabs within the dialog box: General, Score Factors, and Constants.

Scoring Exclusion and Retain Reasons

The exclusion/retain reasons dialog box contains numeric identification numbers with corresponding descriptions that identify categories of scoring exclusion and retention. Examples of scoring exclusion categories are bankrupt and charge-off. An example of a scoring retention category is inactive past six to 12 months.

Client Parms (Client Parameters) Icon Group

The following discussion describes many of the client parameters that can be viewed and edited in the PCTMS.

Values for client parameters are determined during the design phase and preset before the PCTMS is shipped. Most of these parameters are changed only infrequently. However, sometimes it is necessary to make adjustments to the preset values.

The client parms icon group on the PCTMS navigation bar is shown to the left. On this icon group, selecting the SPID icon gives access to the TreeView—SPID assignment window and the SPID control dialog box, and selecting the libraries icon gives access to the exclusion, decision key, block codes, and collection indicators libraries. Icons for accessing client parameters appear when the end user clicks the client parms button in the PCTMS navigation bar.

Strategy Assignment Dialog Box

In the strategy assignment dialog box, one can:

Adjust random digit groups for each SPID.

Assign strategies for each decision area to each digit group within each SPID.

Figure 12:
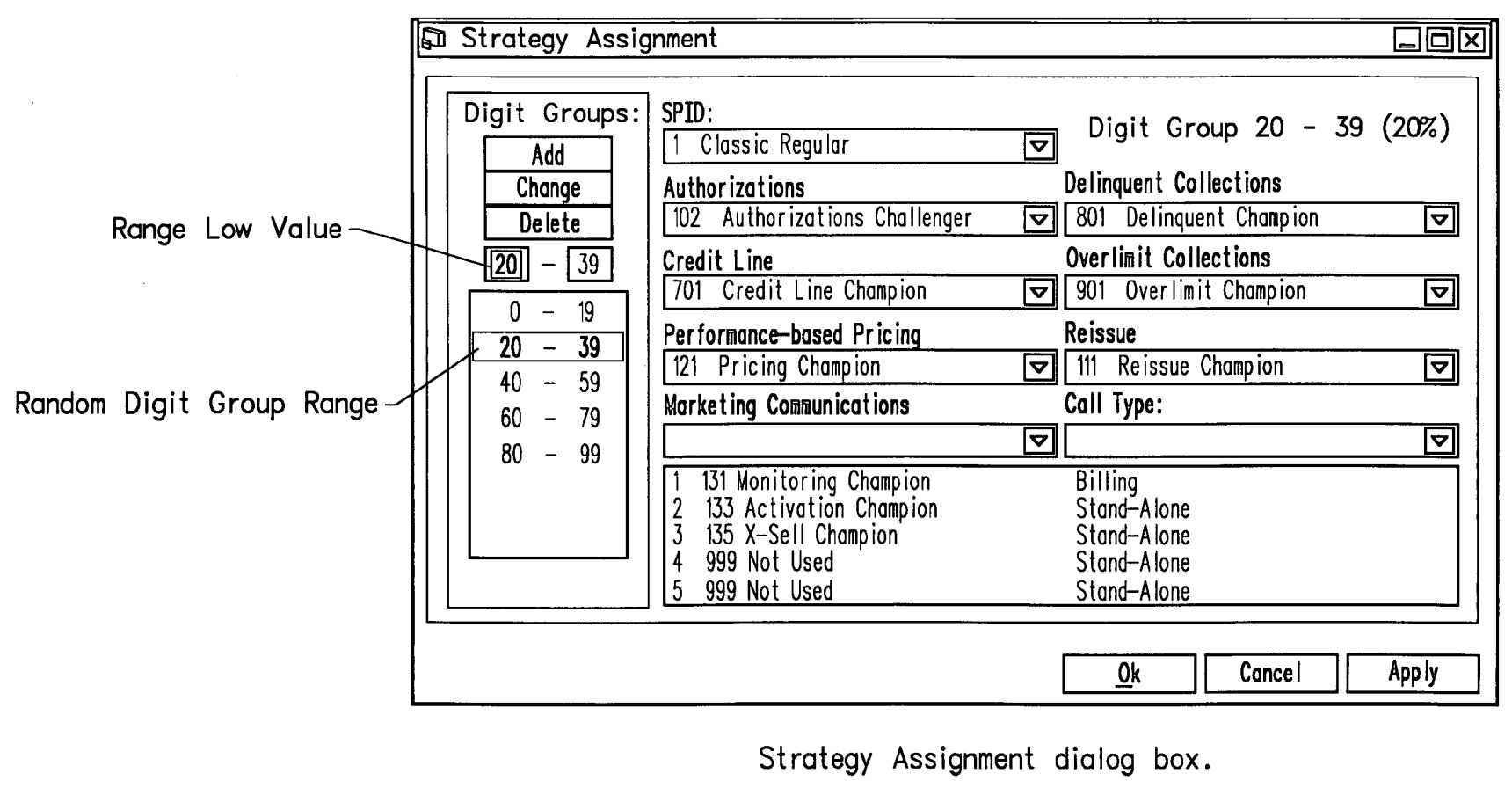

FIG. 12 shows strategy assignment fields for all of the decision areas. Table 19 provides a description of the fields in the strategy assignment box.

TABLE 19

Description of Fields in Strategy Assignment Dialog Box

| Field | Description |
| --- | --- |
| Digit Groups | Lists the random digit groups that you define for assigning strategies. The PCTMS allows you to define up to 100 digit groups. |
| SPID | Identifies the strategic portfolio for each group of accounts that is managed collectively. Strategic portfolios defined in the SPID Control dialog box will display in the list. Up to 98 SPIDs can be defined. |
| Authorizations, Credit Line, Delinquent Collections, Overlimit Collections, Performance-based, Pricing, and Reissue | Identifies the strategy assigned to the SPID and random digit group from each decision area. If you do not wish to assign a strategy to a particular random digit group, select Strategy 999 Not Used. Strategies you heve created on the PCTMS in each of the decision areas will be available in each drop-down list, along with Strategy ID 999. |
| Marketing Communications and Call Type | Identifies the strategy and call type for up to five Marketing Communications strategies assigned to the SPID and random digit group. Strategies selected will appear below these fields in positions 1 through 5, representing the order in which TRIAD will process multiple strategies and assign segment qualifiers. You designate each strategy as pertinent to either a billing or standalone call as selected in the Call Type list. If you do not want to assign a strategy to a particular random digit group, select Strategy 999 Not Used. Marketing Communications strategies you have created on the PCTMS will be available in the drop-down list, along with Strategy ID 999. Valid call types are Billing and Standalone. |

Table 20 provides a description of the fields in the decision areas tab in the option dialog box for the client parms icon group.

TABLE 20

Description of Fields in Decision Areas Tab in Options Dialog Box (Client Parms Icon Group)

| Field | Description |
| --- | --- |
| Decision Areas Permitted | Specifies the decision areas that are available for use. Only the check boxes for the decision areas you have purchased per your contractual agreement with Fair, Isaac will be enabled. Clearing a check box for an enabled decision area will cause that decision area's icon to be hidden in the Decision Areas icon group when you next open the PCTMS. More than one active decision area can be selected. Note: If you are not using an enabled decision area, be sure to turn it off here before running the PCTMS Audit/Export. Permitted decision areas with no defined settings, strategies, or scenarios will generate an AuditExport failure. |
| Industry Type | Specifies the industry type used. The available options will depend on your contractual agreement with Fair, Isaac. Only one option can be selected. The selected industry type determines the profit fields that display in the SPID Control dialog box. In addition, with the Bankcard, Retail, or Mail Order industry type selected, you will receive a "revolving" version of the Strategy Performance reports. With the Installment industry type selected, a Strategy Performance report designed for fixed, installment type loans is generated. |

Keys Dialog Box

The PCTMS enables the end user to view and edit the properties of decision keys that are used within strategies, SPID assignment trees, and marketing communications and performance-based pricing decision area triggers. The standard Keys library contains 85 standard and 35 user-definable decision keys. Behavior Score and Months on Books are two examples of often-used standard keys. Table 21 provides a list of standard keys.

TABLE 21

List of Standard Decision Keys in Keys Dialog Box

| Key Number and Name | |
|---|---|
| 1 | Age |
| 2 | Amount Dispute |
| 3 | Amount Due |
| 4 | Amount Over Cash Line |
| 5 | Amount Overlimit/Open-to-Buy |
| 6 | Amount Past Due |
| 7 | Amount Overlimit/Open-to-Buy - Line 3 |
| 8 | Amount Overlimit/Open to-Buy - Line 4 |
| 9 | Application Score |
| 10 | Attrition Score |
| 11 | Automatic Debits |
| 12 | Average Bill Last 6 Months |
| 13 | Average Debit Last 6 Months |
| 14 | Average Interest Last 6 Months |
| 15 | Average Revenue Last 3 Months |
| 16 | Average Revenue Last 6 Months |
| 17 | Average Revenue Last 12 Months |
| 18 | Balance |
| 19 | Balance - Line 3 |
| 20 | Balance - Line 4 |
| 21 | Balance at Risk |
| 22 | Behavior Score |
| 23 | Block Code |
| 24 | Branch Number |
| 25 | Cash Balance |
| 26 | Cash Balance/Total Balance |
| 27 | Cash Line |
| 28 | Cash Line/Credit Line |
| 29 | Cash Utilization |
| 30 | Credit Bureau Risk Score |
| 31 | Collection Queue |
| 32 | Credit Line |
| 33 | Credit Line - Line 3 |
| 34 | Credit Line - Line 4 |
| 35 | Credit Line Utilization |
| 36 | Cycles Delinquent |
| 37 | Days Delinquent |
| 38 | Days Overlimit |
| 39 | Days Since Extension |
| 40 | Days Since NSF |
| 41 | Days Since Payment |
| 42 | Expected Balance Collected |
| 43 | Geographic Code |
| 44 | Interest Income Last 12 Months |
| 45 | Last Payment Amount/Cash Line |
| 46 | Line 3 Utilization |
| 47 | Line 4 Utilization |
| 48 | Loan-to-value Exposure |
| 49 | Maximum Delinquency Lifetime |
| 50 | Months on Books |
| 51 | Months Since Active |
| 52 | Months to Anniversary |
| 53 | Months Since Cash Advance |
| 54 | Months Since Closure |
| 55 | Months Since Communication |
| 56 | Months Since Last Cash Line Change |
| 57 | Months Since Last Cash Line Decrease |
| 58 | Months Since Last Cash Line Increase |
| 59 | Months Since Delinquency |
| 60 | Months Since Reage |

TABLE 21-continued

List of Standard Decision Keys in Keys Dialog Box

| Key Number and Name | |
|---|---|
| 61 | Months Since Pricing Review |
| 62 | Months Since Purchase |
| 63 | Months Since Terms Change |
| 64 | Months to Annual Fee |
| 65 | Months to Expiration |
| 66 | Months to Terms Expiration |
| 67 | No Contact Indicator |
| 68 | Number NSF Last 6 Months |
| 69 | Percent Balance in Dispute |
| 70 | Percent Balance Remaining |
| 71 | Percent Balance Paid |
| 72 | Phone/Address Indicator |
| 73 | Product Code |
| 74 | Promise to Pay |
| 75 | Rate Tier |
| 76 | Reclass Reason Code |
| 77 | Reissue Review Point |
| 78 | Revenue Score |
| 79 | Special Handling |
| 80 | Transaction Amount |
| 81 | Transaction Amount/Cash Line |
| 82 | Transaction Type |
| 83 | Transactor/Revolver Code |
| 84 | Trigger ID |
| 85 | Type Code |
| Keys 86 through 120 represent User-defined Keys 01 through 35. | |

TreeView

Figure 13:
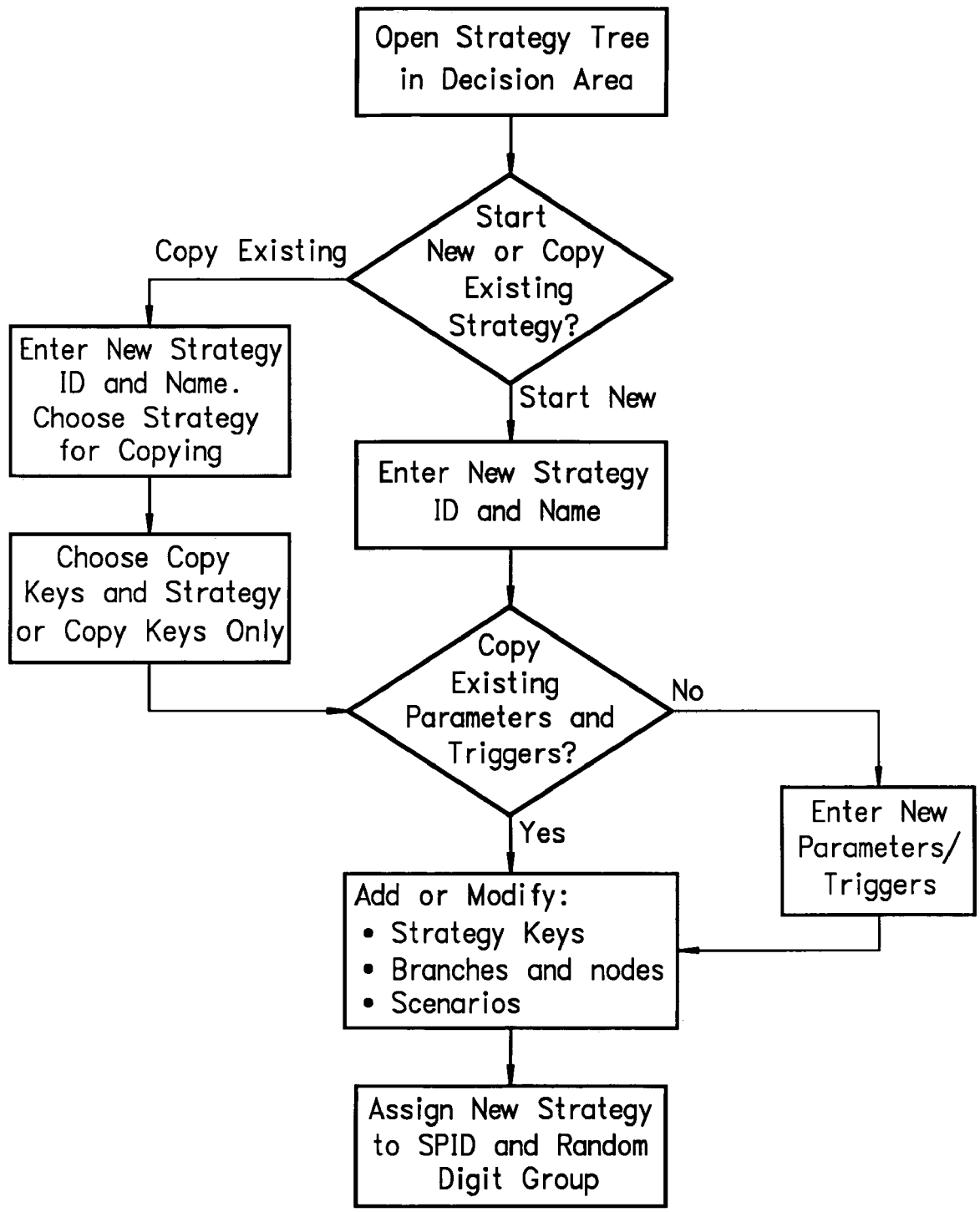
FIG. 13 is a flow diagram showing the starting or modification of a strategy according to the invention.

The PCTMS uses a graphical interface called TreeView to display the strategy, SPID assignment, and scorecard assignment logic. TreeView displays the decision logic for each of these in a tree/branch structure with nodes that display lower-bound values for each key level. Table 22 describes how to access each of the three TreeView windows in the PCTMS. FIG. 13 shows the process of creating a strategy in TreeView.

TABLE 22

How To Locate TreeView Window in the PCTMS

| Window | How to Locate in the PCTMS |
|---|---|
| TreeView - Strategies | Click the decision area icon you want to work in, then click on the TreeView icon. Note: Each decision area icon group that you purchase from Fair, Isaac contains a TreeView icon for accessing your decision area strategy trees. |
| TreeView - SPID Assignment | Click the SPID icon in the Client Parms icon group, then click on the SPID Assign icon. |
| TreeView - Scorecard Assignment | Click the Scoring icon in the Decision Areas icon group, then click the Scorecard Assignment icon. |

Scorecard Manager

The following discuss ion describes features in scorecard manager. Scorecard manager enables the end user to view scorecard data, update existing scorecards, and add new score-cards using the characteristics that are hard coded on the system. Scorecard manager contains libraries for the characteristics and adverse action reasons for use in the scorecards.

The PCTMS contains a separate database of scorecards for each client/environment that is maintained.

Viewing and Editing modes: Scorecard manager is accessible in either of these two modes. With only viewing access, scorecards may be viewed but not edited.

Scorecard: An algorithm in which points are assigned according to characteristic attributes, creating an account's score. Scorecards must be promoted to be viewed and editing within scorecard manager and uploaded to the host system. The end user must promote a scorecard when new scorecards are added.

Characteristics: The system calculates raw behavior scores from account characteristics and associated attributes. Characteristics ask questions about an account such as "What is the highest level of delinquency this account has reached in the last six months?" A typical scorecard can contain 8 to 12 characteristics.

Attributes: Attributes provide a series of multiple choice answers to the questions posed by characteristics. Each attribute has a weight (number of points) associated with it. The summation of these weights across characteristics produces the raw behavior score.

Score weight: Number of points associated with an attribute of a characteristic. Neutral weights are used when there is insufficient information to calculate a characteristic.

GLOSSARY allowable exposure

The allowable exposure for an account is the amount above or below the credit limit for which a transaction will be authorized. Allowable exposure is calculated using Cushion and Percent Fit tests.

attributes

The ranges of values into which a characteristic is divided. Each attribute has a weight associated with it. The summation of the weights produces the unaligned, or raw, score. Attributes are used to label a column in a scorecard. For example, the characteristic "Average Balance Last Six Months" may be divided into four currency attributes: less than 250, 250 to 499, 500 to 3,499, and 3,500 or more.

available credit

See open to buy (OTB)

bad accounts

Accounts that were unsatisfactory during the performance period.

Accounts that are bankrupt, charged-off, or have reached an advanced state of delinquency are often said to be bad.

balance at risk

This field is the product of the current balance multiplied by the probability of the account going bad, based on the behavior score. Balance at Risk is used as a key in many decision areas, as well as to order collection queues.

behavior score

A numeric value for assessing account risk. It is derived from calculations that quantify current and past account behavior. This term encompasses several types of scorecards.

branch

The path an account takes in the Strategy Tree diagram to reach its treatment group. A branch represents one row of a Strategy table.

breakpoints

See Overlimit Breakpoints.

cash cushion

See cushion.

centering

To base the Challenger strategy on the Champion strategy; you center the Challenger on the Champion.

Challenger

A new strategy to be tested against the Champion. When the Challenger outperforms the Champion, you can apply it to a larger percentage of the portfolio and the Challenger becomes the Champion. It is possible to have several Challengers being tested against your Champion within the same decision area.

Champion

The strategy that depicts your current business practices.

Champion/Challenger testing is an integral feature of TRIAD. See also Challenger.

characteristic

A measurement of account behavior. Essentially, it poses a question about an account. For example, the Time-on-Books characteristic asks, "How long has this account been open?" Each characteristic is broken into definite ranges of values called attributes. Characteristics are used to label a row in a scorecard.

clean account

An account that has not been delinquent for an indicated number of months (usually, 12 months).

cleverness index

A term describing the Average Balance Performance Ratio found on the third page of the Strategy Performance reports. The lower the ratio, the better the strategies are performing.

coarse classing

The process in which individual attributes are grouped for statistical validity.

credit line

The credit line or credit limit of an account is the amount of credit extended to the accountholder. A credit line may be increased temporarily through a cushion or for an extended period through a credit line increase. Credit lines may also be decreased and reduced to zero. Credit lines are managed primarily in the Credit Line Management decision area in the system.

cushion

A special extension of a credit or cash line, used in the Authorizations decision area. Other names for cushion are "shadow limit," "pad," or "pencil limit." The PCTMS includes several options for calculating the cushion, as set in the Cushion Type field.

cushion type

Defines how the cushion test will be applied. It has four options: Utilization, Line, Designated Amount, and Zero. The four cushion types apply to normal and holiday volumes for both credit and cash transactions.

decision area

A management area for treating accounts. Several decision areas are available in the system:

Authorizations

Credit Line Management

Delinquent Collections

Marketing Communications

Overlimit Collections Performance-based Pricing

Reissue Management decision key

A characteristic used in SPID assignment and strategy decisioning. Decision keys are also used as triggers in the Marketing Communications and Performance-based Pricing decision areas.

delinquency rollover

The movement of an account to a higher level of delinquency.

digit group

Also known as "random digit groups," a series of contiguous random digits used in strategy assignment to facilitate Champion/Challenger testing. Each user-defined digit group represents a percentage of the accounts in a SPID. For example, the range 0-9 contains approximately 10% of the accounts in the SPID, and the range 50 to 99 contains approximately 50% of the accounts.

dirty account

An account that has been delinquent during an indicated period, often 12 months.

dynamic reclassification

Assigning a delinquent account to a different scenario during daily processing. Dynamic reclassification enables you to re-evaluate a delinquent account when the delinquency status or balance changes.

environment

A named area on a host system which contains a complete set of control tables. Most clients define more than one environment on their host system. You can create up to three PCTMS environments to contain the control tables which mirror each of the host system environments. See also pre-production environment; production environment; test environment.

Estimator reports

The Estimators produce reports for each decision area that estimate the number of accounts that are defined by each row of the control tables and the risk quality of these accounts.

exclusion

A reason for removing accounts from a particular aspect of processing, such as behavior scoring or a decision area. For example, bankruptcy is often an exclusion from many decision areas, including Delinquent Collections and Credit Line.

exclusion score

Special behavior score values that indicate that an account has been excluded from behavior scoring. Bankruptcy or inactivity are frequent exclusion reasons, each with a user-assigned exclusion score. Exclusion scores can be isolated in a strategy key in order to treat accounts that are not scored.

good accounts

Accounts that were satisfactory throughout the performance period, as defined in the scorecard performance measures.

holiday cushion

In the Authorizations decision area, a special extension of the credit or cash line for use during designated holiday periods. See also cushion.

holiday percent fit

A percentage of the transaction that must fit in the current available credit if the transaction is to be approved. The Holiday parameter enables you to designate a holiday period and use a different value.

indeterminate accounts

Accounts that did not qualify as good or bad after the performance period.

multiplier

In scorecard terminology, multiplier refers to an alignment factor used to keep scores consistent across all scorecards and portfolios. For example, if a score of 600 in Portfolio A has odds of 60/1, that score in Portfolio B should also have odds of 60/1. Two alignment factors, the multiplier and weight, are used to bring scores back into alignment. Scorecards are delivered with a multiplier of 1.0. In the Credit Line Management decision area, the line multiplier is one of five calculation method options available for use in Credit Line scenarios.

odds

Indicate the probability that an account will or will not reach an unsatisfactory condition over the next specified number of months.

odds-to-score relationship

The relationship of the odds to the score, such as odds of 60 to 1 at a score of 600. The odds-to-score relationship is determined during the scorecard delivery meeting. May also be referred to as "scaling."

open-to-buy (OTB)

The amount of credit that remains when the account's current balance and outstanding authorizations are subtracted from the credit line. Synonymous with "available credit."

Overlimit Breakpoint

A trigger in the Overlimit Collections decision area. There are two types of Overlimit Breakpoints: amount and utilization. When a breakpoint is crossed, it triggers a review in the Overlimit Collections Strategy table. Crossing a breakpoint has a very precise definition. To cross a breakpoint, the account's balance before posting must be less than the designated breakpoint; its balance after posting must be equal to or greater than the breakpoint.

pad

See cushion.

PC Table Maintenance System (PCTMS)

The PC-based system through which host system control tables are viewed and updated. The PCTMS is where you build, modify, and assign your strategies; run the PC Audit program; and update parameters for host-system Estimator reports.

PDO

See points to double the odds.

pencil limit

See cushion.

percent fit

A test in the Authorizations Management decision area that checks whether a specified percentage of a transaction fits within the current open to buy.

performance period

During scorecard development, the performance period is the length of time between the observation date and the performance date. Often for standard behavior score-cards, this period is six months. After the behavior scorecards have been implemented, the performance period refers to the amount of time over which the performance of the scorecards is examined, typically the same interval that was used in development. The performance period is also called the "performance window."

points to double the odds (PDO)

The number that indicates the increment in score at which the odds will double. For example, a 20-point PDO means that the odds of good to bad accounts will double every 20 points. See also odds-to-score relationship.

pre-production environment
An environment that may contain a modified copy of a test environment awaiting placement in production. See also production environment; test environment.

production environment
An environment where the actual processing that affects the accounts and customers on your system takes place. See also pre-production environment; test environment.

pseudo-champion
The first strategy you build in the system to mimic your existing business practices.

random digit group
See digit group.

random digit
A number between 0 and 99 assigned randomly to each account when the file is initialized. New accounts are assigned a random digit during new account processing. The system uses random digits to divide the SPID into statistically significant groups called digit groups, for Champion/Challenger testing.

raw score
A behavior score that has not been aligned or weighted. On a scorecard, it is the sum of all characteristic weights on the card.

retained score
A behavior score for an account whose score was retained from a prior month and not recalculated.

roll rate
The progression of delinquency from one level to the next.

scenario
A set of actions to be assigned to accounts. Scenarios are specific to each decision area and are used in conjunction with a strategy. Examples of scenarios are: setting a block code; sending a letter; setting a collection indicator; including a statement insert; or taking no action at all. Scenarios are updated using the PCTMS.

scenario ID
A number from 1 to 999 that identifies a scenario. The same ID can be used in more than one decision area.

Scenario table
The repository of action sets for a decision area. Each decision area has one scenario table, whose scenarios are shared by all the strategy tables in that decision area.

scorecard
An algorithm for assigning a score, or numeric points, to an account based on characteristic attributes. A scorecard is used to derive a behavior score or other type of score for an account.

ScoreNet®
A Fair, Isaac service that provides information from the major North American credit bureaus.

shadow limit
Within the credit industry this term is equivalent to cushion.

SPID
See strategic portfolio; strategic portfolio identification number (SPID).

SPID 99
A group of accounts excluded from TRIAD treatment. For example, you can assign accounts whose receivables you do not own to SPID 99.

strategic portfolio
A group of accounts managed collectively. For example in the Bankcard industry, Classic and Gold accounts can be put into separate strategic portfolios because the account characteristics are different. Each strategy portfolio in TRIAD can be designated with one of four industry types: Bankcard, Installment, Mail Order, and Retail.

strategic portfolio identification number (SPID)
A number from 1 to 99 that identifies a strategic portfolio in the system.

strategy
A logic or plan by which accounts are divided into groups that receive different actions, or scenarios. Strategy keys are decision keys within each strategy that sort accounts for different treatments.

strategy ID 999
A special strategy ID that signals to bypass decision area processing for that account. Strategy 999 accounts are processed by the calling program, not the system.

strategy key
A characteristic that defines the conditions that cause an account to be assigned to a scenario. One of the three essential building blocks (along with scenarios and parameters/triggers) from which strategies are made.

Strategy table
The control table on the host system that defines various account profiles and assigns a set of treatments to each defined group.

strategy tree
A graphical representation of a strategy in the PCTMS, created using TreeView.

test digits
See random digits.

test environment
An environment used to run systems testing for installation of new data and/or software systems into the host. See also pre-production environment; production environment.

transaction type
User-defined ranges used in the Authorizations decision area to designate transactions using a transaction identifier field. This field can be a strategy key in the Authorization decision area. The Transaction Type also plays a role in creating the Authorization Report Record file.

treatment area
See decision area.

TreeView•••
The utility in the PCTMS that lets you design strategy trees graphically. You can add, change, delete, or move branches as needed. You can copy a branch to another place in the same tree or a different tree. You can print copies of the strategy trees you develop.

weight
Score weight refers to a number assigned to an attribute in a scorecard. The sum of all weights makes up an account's raw score. In the PCTMS, the Weight field accessed within your scorecard assignment tree refers to an alignment factor used to keep scores consistent across all scorecards and portfolios. For example, if a score of 600 in Portfolio A has odds of 60/1, that score in Portfolio B should also have odds of 60/1. Two alignment factors, the multiplier and weight, are used to bring scores back into alignment. The value in the Weight field is an additive factor used after the multiplier has been applied and may be positive or negative.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An account management system for statistically based automated decision making, comprising:
   a host system comprising an account management component of said account management system, said host system performing all account management processing and comprising one or more scoring and functionally/predictive models for generating decisions; report records used for testing purposes, said reports generated for most decision areas,
   wherein said report records contain all account management actions and other information on each account through-out a cycle in which a new behavior score is computed, accounts are sorted into treatment groups, and a set of actions are returned,
   wherein said report records are provided as a client system input; and a data warehouse for facilitating use of said score and decision models;
   a client system networked with host system said client system comprising a graphical front end component for end user interaction with said account management system, said client system comprising means for managing database files and control settings for said account management component and means for uploading said database files and said control settings to said account management component for processing by said account management system and for receiving results from said account management system; and
   a calling program for allocating data areas at said host system, said calling program comprising means for receiving said database files and said control settings from said client system as an input to said account management system and means for writing said database files and said control settings to said allocating data areas at said host system, and means for returning results read from said allocated data areas of said account management system to said client system;
   said account management system comprising means for performing its operations by writing account management system actions and other information to a report record file comprising at least said allocated data areas; and
   said client system comprising a plurality of user applications, including applications for providing a graphical view of strategies and strategic portfolio assignments;
   wherein said account management system is integrated with said end user applications at said client system by said calling program to perform all account management processing at said account management system and to provide said end user with said graphical front end component and end user application access at said client system; and
   wherein said cycle comprises a processing order comprising:
   assigning an account to a strategic portfolio;
   assigning strategy IDs for decision areas;
   calculating a behavior score;
   reviewing an account for credit line actions;
   reviewing said account for delinquent actions;
   reviewing said account for overlimit actions;
   writing to said report records; and
   returning action and other data to said calling program.

2. The system of claim 1, wherein said account management system comprises any of:
   a delinquent collections mechanism that reduces delinquencies and that uses collections resources more efficiently by assessing accounts in order of their risk and then queuing them for action accordingly;
   a usage limit management mechanism that improves end user profits by expanding usage while controlling risk by allowing an end user to determine whether to assign or adjust usage limits based upon each customer's credit risk;
   an authorizations management mechanism that reduces an end user's risk of losses by reviewing account status to determine whether high risk accounts should be hotlined or blocked; and
   a marketing communications mechanism that effectively targets cross-sell products and retention of customers efforts to maximize end user revenue and minimize risk and churn.

3. The system of claim 1, wherein said account management system further comprises:
   strategies and strategic portfolio assignments, wherein a strategy is a plan for assigning an account to a specific scenario, or action for treatment, and wherein said strategic portfolios comprise groups of accounts that can be managed collectively because they share common characteristics.

4. The system of claim 3, wherein said account management system further comprises:
   means for providing an end user with the ability to compare competing strategies in a statistically valid way so that said end user can determine which strategy produces the best results.

5. The system of claim 3, further comprising:
   at least one strategy key for sorting accounts into groups that receive different treatments.

6. The system of claim 3, further comprising:
   at least one strategy tree with which an end user can separate accounts into tightly defined treatment groups and take actions that balance revenue and risk.

7. The system of claim 3, further comprising:
   at least one scenario assigned to each treatment group in a strategy;
   wherein said action comprises any of a simple action and a complex action.

8. The system of claim 7, wherein a simple action can be to take no action at all, and wherein a complex action can include any of setting a block code, sending a letter, setting a collection indicator, or printing a statement message.

9. The system of claim 3, further comprising:
   an audit program that is run when developing a new strategy or modifying control fields.

10. The system of claim 1, wherein said graphical front-end component further comprises:
    means for allowing an end user to view scorecard assignments; and comprises any of:
    means for allowing an end user to update existing scorecards; and
    means for allowing an end user to add new scorecards.

11. The system of claim 1, comprising at least one account, wherein each account has a two-digit number between 00 and 99, which is a random digit or a test digit assigned by said account management engine when said account is opened or brought into said account management system.

12. The system of claim 11, further comprising:
    a strategy assignment mechanism for linking strategies to one or more random digit groups for each strategic portfolio or SPID.

13. The system of claim 1, further comprising:
at least one decision area for applying separate strategies for each key process that influences the profitability of a portfolio.

14. The system of claim 13, wherein an end user may exclude categories of accounts from behavior scoring and each decision area.

15. The system of claim 13, wherein entry into each decision area is triggered by a primary event.

16. The system of claim 1, said account management system further comprising:
an estimator program for tallying a number of accounts identified by each control table row and the odds or risk quality for these accounts.

17. The system of claim 1, wherein management database files and control settings are uploaded from said client system to said host system for processing.

* * * * *